(12) United States Patent
Lin et al.

(10) Patent No.: US 12,085,335 B2
(45) Date of Patent: Sep. 10, 2024

(54) OVEN DRYING APPARATUS AND COATING DEVICE

(71) Applicant: CONTEMPORARY AMPEREX TECHNOLOGY CO., LIMITED, Ningde (CN)

(72) Inventors: Yinxiang Lin, Ningde (CN); Peng Jin, Ningde (CN); Chao Guo, Ningde (CN); Nengwu Liao, Ningde (CN); Lijun Li, Ningde (CN); Xuefeng Kang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/201,647

(22) Filed: May 24, 2023

(65) Prior Publication Data
US 2023/0296315 A1    Sep. 21, 2023

Related U.S. Application Data

(63) Continuation of application No. PCT/CN2022/097939, filed on Jun. 9, 2022.

(30) Foreign Application Priority Data

Jul. 30, 2021 (CN) .......................... 202110876189.0

(51) Int. Cl.
*F26B 3/04* (2006.01)
*F26B 25/06* (2006.01)
*H01M 4/04* (2006.01)

(52) U.S. Cl.
CPC ................ *F26B 3/04* (2013.01); *F26B 25/06* (2013.01); *H01M 4/0409* (2013.01); *H01M 4/0471* (2013.01)

(58) Field of Classification Search
CPC ......... F26B 3/04; F26B 25/06; H01M 4/0409; H01M 4/0471
(Continued)

(56) References Cited

U.S. PATENT DOCUMENTS 2,364,080 A * 12/1944 Kruse ................... F26B 21/02
34/67
3,199,224 A    8/1965 Brown
(Continued)

FOREIGN PATENT DOCUMENTS

CN    102476095 A    5/2012
CN    102641835 A    8/2012
(Continued)

OTHER PUBLICATIONS

International Search Report and Written Opinion mailed on Aug. 29, 2022, in corresponding PCT/CN2022/097939, 19 pages.
(Continued)

*Primary Examiner* — Stephen M Gravini
(74) *Attorney, Agent, or Firm* — XSENSUS LLP

(57) ABSTRACT

The present application provides an oven drying apparatus and a coating device. The oven drying apparatus comprises an oven drying chamber and a heating assembly. The oven drying chamber is equipped with a first oven drying side having a plurality of first air inlet portions for fluid medium to enter the oven drying chamber. The heating assembly is disposed on the first oven drying side. The first oven drying side is further provided with at least one air return portion provided between two adjacent first air inlet portions, and the air return portion being configured for fluid medium in the oven drying chamber to be discharged from the oven drying chamber. The arrangement of an air return portion between two first air inlet portions can discharge fluid medium between the two first air inlet portions and take (Continued)

away the heat, thus avoiding accumulation of heat between the two first air inlet portions.

19 Claims, 11 Drawing Sheets

(58) Field of Classification Search
USPC .......................................................... 34/224
See application file for complete search history.

(56) References Cited

U.S. PATENT DOCUMENTS

| | | | | | |
|---|---|---|---|---|---|
| 3,757,427 | A | * | 9/1973 | Wilkinson | ............... B05D 3/04 |
| | | | | | 34/479 |
| 4,235,023 | A | * | 11/1980 | Best | .................... F27B 17/0083 |
| | | | | | 34/212 |
| 5,568,692 | A | * | 10/1996 | Crompton | ............... F26B 23/10 |
| | | | | | 392/416 |
| 5,881,476 | A | * | 3/1999 | Strobush | ................. F26B 13/10 |
| | | | | | 34/643 |
| 2012/0231138 | A1 | * | 9/2012 | Poston | ...................... F23D 3/08 |
| | | | | | 426/520 |
| 2014/0202028 | A1 | * | 7/2014 | De Santos Avila | ....... F26B 3/20 |
| | | | | | 34/618 |
| 2023/0296315 | A1 | * | 9/2023 | Lin | ........................... F26B 3/04 |
| | | | | | 118/64 |

FOREIGN PATENT DOCUMENTS

| | | | | |
|---|---|---|---|---|
| CN | 103586182 | A | | 2/2014 |
| CN | 206153096 | U | | 5/2017 |
| CN | 206425148 | U | | 8/2017 |
| CN | 206919606 | U | | 1/2018 |
| CN | 207204524 | U | | 4/2018 |
| CN | 207563214 | U | | 7/2018 |
| CN | 209753324 | U | | 12/2019 |
| CN | 111842066 | A | | 10/2020 |
| CN | 215465733 | U | | 1/2022 |
| CN | 115672692 | A * | 2/2023 | .............. F26B 25/06 |
| DE | 69910578 | T2 | | 6/2004 |
| EP | 0272854 | A2 | | 6/1988 |
| EP | 2853849 | A1 | | 4/2015 |
| EP | 4234105 | A1 * | 8/2023 | .............. F26B 25/06 |
| JP | 2009-133525 | A | | 6/2009 |
| WO | 2012/133152 | A1 | | 10/2012 |
| WO | WO-2023005446 | A1 * | 2/2023 | .............. F26B 25/06 |

OTHER PUBLICATIONS

Office Action issued on Apr. 15, 2023, in corresponding Chinese patent Application No. 202110876189.0, 26 pages.
Office Action issued on Sep. 10, 2023, in corresponding Chinese patent Application No. 202110876189.0, 22 pages.
Extended European Search Report issued Apr. 12, 2024 in European Patent Application No. 22848055.4.

* cited by examiner

OVEN DRYING APPARATUS AND COATING DEVICE

CROSS-REFERENCE TO RELATED APPLICATIONS

The present application is a continuation of PCT Patent Application No. PCT/CN2022/097939, entitled "OVEN DRYING APPARATUS AND COATING DEVICE" filed on Jun. 9, 2022, which claims priority to Chinese patent application 202110876189.0 entitled "OVEN DRYING APPARATUS AND COATING DEVICE" filed on Jul. 30, 2021, the entire contents of which are incorporated herein by reference.

TECHNICAL FIELD

The present application relates to the technical field of batteries and, in particular, to an oven drying apparatus and a coating device.

BACKGROUND ART

With the application and gradual popularization of lithium-ion batteries in the field of communication, portable electronic products, electric vehicles, aerospace, ships, etc., the requirements for high range and safety performance of batteries have become increasingly stronger, and higher requirements have been put forward for the process of coating electrode sheets of lithium-ion power batteries, especially in the oven drying stage of the electrode sheets, which directly affects the forming quality of the electrode sheets.

Therefore, how to improve the quality of oven drying of the electrode sheets has become an urgent problem in the field of batteries.

SUMMARY OF THE INVENTION

Embodiments of the present application provide an oven drying apparatus and a coating device to improve the quality of oven drying of electrode sheets.

In a first aspect, an embodiment of the present application provides an oven drying apparatus comprising an oven drying chamber and a heating assembly. The oven drying chamber is used for accommodating a to-be-oven-dried member, the oven drying chamber having a first oven drying side facing the to-be-oven-dried member, with the first oven drying side having a plurality of first air inlet portions for fluid medium to enter the oven drying chamber. The heating assembly is disposed on the first oven drying side, the heating assembly being configured to oven-dry the to-be-oven-dried member. Wherein, the first oven drying side is further provided with an air return portion, at least one air return portion being provided between two adjacent first air inlet portions, and the air return portion being configured for fluid medium in the oven drying chamber to be discharged from the oven drying chamber.

In the above technical solution, at least one air return portion is arranged between two adjacent first air inlet portions, and the air return portion can discharge fluid medium in the oven drying chamber from the oven drying chamber. When fluid medium is provided to the oven drying chamber via the two adjacent first air inlet portions, the fluid medium is guided between the two first air inlet portions by the to-be-oven-dried member after it acts on the to-be-oven-dried member, so that the heat carried by the fluid medium accumulates between the two first air inlet portions, which causes the corresponding portion between the two adjacent first air inlet portions to be overheated, thus leading to non-uniform heating of various parts of the to-be-oven-dried member, and the arrangement of the air return portion between the two first air inlet portions can discharge the fluid medium between the two first air inlet portions and take away the heat, thus avoiding accumulation of heat between the two first air inlet portions and improving the heating uniformity of the to-be-oven-dried member.

In some embodiments of the first aspect of the present application, the oven drying apparatus comprises a first wall facing the to-be-oven-dried member in a first direction, the first air inlet portions, the heating assembly, and the air return portion being all disposed on the first wall; and the oven drying apparatus further comprises a first drive unit, the first drive unit being configured to adjust the distance between the first wall and the to-be-oven-dried member in the first direction.

In the above technical solution, the first drive unit is capable of driving the first wall provided with the first air inlet portions, the heating assembly, and the air return portion to move to adjust the distance between the first wall and the to-be-oven-dried member in the first direction, so as to adjust the distance between the heating assembly and the to-be-oven-dried member to meet different heating needs and improve the quality of heating.

In some embodiments of the first aspect of the present application, the oven drying apparatus further comprises a first air inlet chamber, the first air inlet chamber being separated from the oven drying chamber by a first wall, the first air inlet portions, the heating assembly, and the air return portion being all disposed on the first wall, wherein the first air inlet portions are used for fluid medium in the first air inlet chamber to enter the oven drying chamber.

In the above technical solution, the oven drying apparatus further comprises the first air inlet chamber, and the fluid medium, after entering the first air inlet chamber, enters the oven drying chamber via the plurality of first air inlet portions, so that the fluid medium can be uniformly distributed in the oven drying chamber, thereby improving the heating uniformity of the to-be-oven-dried member. The first air inlet chamber and the oven drying chamber share the first wall and are separated by the first wall, which can reduce the volume of the oven drying apparatus.

In some embodiments of the first aspect of the present application, the oven drying apparatus further comprises an air return chamber and a circulation unit, the air return chamber being configured to accommodate fluid medium discharged from the air return portion and the circulation unit being configured to import fluid medium in the air return chamber into the first air inlet chamber.

In the above technical solution, the fluid medium discharged from the air return portions can be accommodated in the air return chamber and then enter the first air inlet chamber under the action of the circulation unit, so that it can enter the oven drying chamber via the first air inlet portions, which allows the recycle use of heat generated by the heating assembly in the oven drying chamber, thus reducing energy consumption.

In some embodiments of the first aspect of the present application, the oven drying chamber further has a second oven drying side arranged opposite to the first oven drying side in a first direction, the second oven drying side being provided with a plurality of second air inlet portions for fluid medium to enter the oven drying chamber.

In the above technical solution, the second air inlet portions enable the fluid medium enter the oven drying chamber from the second oven drying side of the oven drying chamber, which can speed up the flow of the fluid medium in the oven drying chamber, thus speeding up the flow of heat in the oven drying chamber to make the heat uniformly distributed inside the oven drying chamber, thus improving the heating uniformity of the to-be-oven-dried member.

In some embodiments of the first aspect of the present application, the oven drying apparatus comprises a first wall facing the to-be-oven-dried member in the first direction and a second wall arranged opposite to the first wall, the first air inlet portions, the heating assembly, and the air return portion being all disposed on the first wall and the second air inlet portions being disposed on the second wall; and the oven drying chamber being located between the first wall and the second wall in the first direction; and the oven drying apparatus further comprises a second drive unit, the second drive unit being configured to drive the second wall to move to adjust the distance between the second wall and the first wall in the first direction.

In the above technical solution, the second drive unit can drive the second wall to move to adjust the distance between the second wall and the first wall in the first direction, so as to adapt to the to-be-oven-dried members having different sizes along the first direction.

In some embodiments of the first aspect of the present application, at least one heating assembly is provided between two adjacent first air inlet portions.

In the above technical solution, at least one heating assembly is provided between two adjacent first air inlet portions, so that the first air inlet portions can bring the heat of the heating assembly to each position of the oven drying chamber with the flow of the fluid medium when providing fluid medium to the oven drying chamber, which improves the uniformity of heat distribution, thereby improving the heating uniformity of the to-be-oven-dried member.

In some embodiments of the first aspect of the present application, the oven drying apparatus comprises an air blowing portion, the air blowing portion being configured to provide fluid medium to the heating assembly to adjust the temperature of the heating assembly.

In the above technical solution, the air blowing portion is capable of providing fluid medium to the heating assembly to adjust the temperature of the heating assembly, for example, the air blowing portion provides cool air to the heating assembly to cool down the heating assembly, which can improve the life of the heating assembly.

In some embodiments of the first aspect of the present application, the heating assembly comprises a mounting bracket and a heating unit, the mounting bracket being disposed on the first oven drying side, and the heating unit and the air blowing portion being both disposed on the mounting bracket.

In the above technical solution, the heating unit and the air blowing portion are both disposed on the mounting bracket, so that the air blowing portion is disposed close to the heating unit, and thus the fluid medium entering from the air blowing portion can act on the heating unit directly or after a short distance, thereby reducing the influence of the fluid medium provided by the air blowing portion on the temperature inside the oven drying chamber.

In some embodiments of the first aspect of the present application, the heating assembly further comprises a guard member, the guard member being disposed on the mounting bracket and enclosing the outer periphery of the heating unit.

In the above technical solution, the arrangement of the guard member can separate the heating unit and the to-be-oven-dried member, so as to avoid damaging the to-be-oven-dried member due to direct contact between the to-be-oven-dried member and the heating unit.

In some embodiments of the first aspect of the present application, the distance between one of the two first air inlet portions and the air return portion is equal to the distance between the other of the two first air inlet portions and the air return portion.

In the above technical solution, the air return portion is disposed at an intermediate position between the two adjacent first air inlet portions, which is conducive to improving the uniformity of heat distribution in the oven drying chamber.

In the second aspect, an embodiment of the present application provides a coating device comprising a coating apparatus and an oven drying apparatus provided in the embodiments of the first aspect. The oven drying apparatus is used for oven-drying a coating coated on the substrate.

In the above technical solution, an air return portion is disposed in the oven drying chamber of the coating device, and the air return portion can discharge fluid medium in the oven drying chamber from the oven drying chamber. When fluid medium is provided to the oven drying chamber via the two adjacent first air inlet portions, the fluid medium is guided between the two first air inlet portions by the to-be-oven-dried member after it acts on the to-be-oven-dried member, so that the heat carried by the fluid medium accumulates between the two first air inlet portions, which causes the corresponding portion between the two adjacent first air inlet portions to be overheated, thus leading to non-uniform heating of various parts of the to-be-oven-dried member, and the arrangement of the air return portion between the two first air inlet portions can discharge the fluid medium between the two first air inlet portions and take away the heat, thus avoiding accumulation of heat between the two first air inlet portions and improving the heating uniformity of the to-be-oven-dried member.

In some embodiments of the second aspect of the present application, the coating apparatus comprises a first coating mechanism and a second coating mechanism, the second coating mechanism being disposed downstream of the first coating mechanism, and the first coating mechanism being configured to coat a first surface of the substrate and the second coating mechanism being configured to coat a second surface of the substrate that is opposite to the first surface; and the coating device comprises two oven drying apparatuses, one of the two oven drying apparatuses being disposed downstream of the first coating mechanism and located upstream of the second coating mechanism to oven dry a coating on the first surface, and the other of the two oven drying apparatuses being located downstream of the second coating mechanism to oven dry a coating on the second surface.

In the above technical solution, one of the two oven drying apparatuses is used for oven drying the coating on the first surface of the substrate and the other is used for oven drying the coating on the second surface of the substrate, thereby improving the uniformity of heating of the substrate.

In some embodiments of the second aspect of the present application, the coating device further comprises a heating apparatus, the heating apparatus being disposed downstream of the oven drying apparatus located downstream of the second coating mechanism, and the heating apparatus being configured to oven dry the coating on the second surface.

In the above technical solution, upstream of the heating apparatus, the coating on the first surface and the coating on the second surface of the substrate are oven-dried by their respective corresponding oven drying apparatuses, wherein during the oven-drying of the coating on the second surface, the coating on the first surface is oven-dried again, so that the coating on the first surface and the coating on the second surface are oven-dried to different degrees, resulting in non-uniform oven drying, while the heating apparatus is capable of oven drying the coating on the second surface for a second time to enable the degrees of oven drying of the coating on the first surface and the coating on the second surface to tend to be consistent, thereby reducing the difference in oven drying between the coating on the first surface and the coating on the second surface.

DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
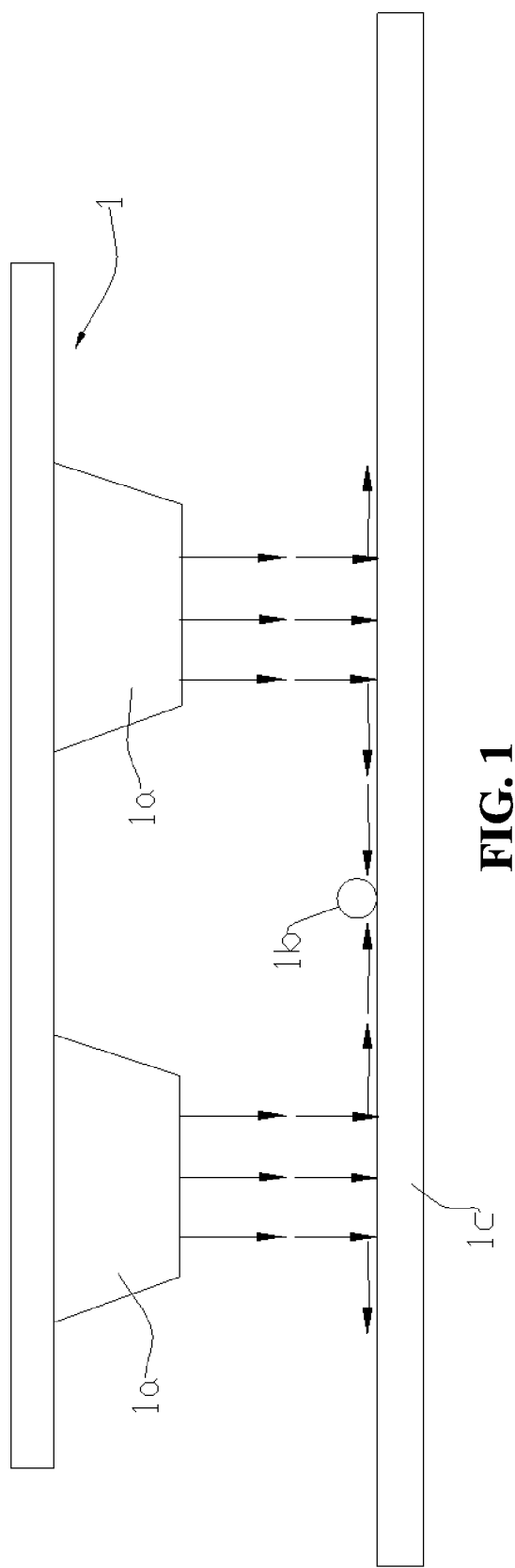
FIG. 1 is a schematic structural view of an oven drying apparatus in the prior art.

Reference numerals: 1—Oven dryer; 1a—Air inlet nozzle; 1b—Convergence region; 1c—Electrode sheet; 1000—Coating device; 100—Coating apparatus; 110—First coating mechanism; 120—Second coating mechanism; 200—Oven drying apparatus; 20—Oven drying chamber; 201—First oven drying side; 202—Second oven drying side; 21—Heating assembly; 211—Mounting bracket; 212—Fixing groove; 213—Heating unit; 214—Guard member; 22—First air inlet portion; 23—Air return portion; 24—First wind box; 241—First wall; 242—First air inlet chamber; 243—First box body; 244—First air supply port; 25—First drive unit; 26—Outer box; 262—First inlet; 263—First outlet; 264—First air discharge port; 27—Second air inlet portion; 28—Second wind box; 281—Second wall; 282—Second air inlet chamber; 283—Second box body; 284—Second air supply port; 29—Second drive unit; 30—Air return chamber; 31—Circulation unit; 32—First air discharge unit; 33—First fresh air port; 35—First preheating assembly; 36—Filtering mechanism; 37—Air blowing portion; 400—Unwinding apparatus; 500—First pass roller assembly; 510—First pass roller; 600—Unwinding deviation rectification apparatus; 700—First outlet deviation rectification apparatus; 800—Second outlet deviation rectification apparatus; 900—First traction apparatus; 1100—Second traction apparatus; 1200—First surface density measurement apparatus; 1300—Second surface density measurement apparatus; 1400—Head deviation rectification apparatus; 1500—Climbing apparatus; 1600—Heating apparatus; 1610—Heating box; 1611—Air supply portion; 1612—Air discharge portion; 1613—Second inlet; 1614—Second outlet; 1615—Second air discharge port; 1620—Oven drying assembly; 1630—Drive roller; 1631—First drive roller; 1632—Second drive roller; 1640—Circulation assembly; 1650—Filtering assembly 1660—Second preheating assembly; 1670—Second fresh air port; 1680—Second air discharge unit; 1700—Cooling and traction apparatus; 1710—Cooling box; 1720—Cooling portion; 1730—Traction roller; 1740—Tension adjustment mechanism; 1780—Tension sensor; 1790—Tension separation mechanism; 1791—Pressing roller; 1792—Pressing roller drive unit; 1900—Rewinding apparatus; 2000—Rewinding deviation rectification apparatus; 2100—Import roller; 2200—Export roller; 3000—Substrate; 3100—Conveying section; A—First direction; B—Second direction; C—Third direction.

DETAILED DESCRIPTION

For the objects, technical solutions and advantages of the embodiments of the present application to be clearer, the technical solutions in the embodiments of the present application will be clearly and completely described below in conjunction with the drawings in the embodiments of the present application, and it is apparent that the described embodiments are a part of the embodiments of the present application rather than all the embodiments. The assembly of the examples of the present application generally described and illustrated in the drawings herein can be arranged and designed in a variety of different configurations.

Accordingly, the following detailed description of the embodiments of the present application provided in the accompanying drawings is not intended to limit the scope of the present application for which protection is claimed, but merely to indicate selected embodiments of the present application. Based on the embodiments in the present application, all other embodiments obtained by those of ordinary skill in the art without creative effort fall within the protection scope of the present application.

It should be noted that in case of no conflicts, the features of the embodiments in the present application may be combined with each other.

It should be noted that similar symbols and letters denote similar items in the following accompanying drawings, so that once an item is defined in one of the accompanying drawings, it needs not to be further defined and explained in the subsequent drawings.

In the description of the embodiments of the present application, it should be noted that the orientation or positional relationship is indicated as being based on the orientation or positional relationship shown in the accompanying drawings, or the orientation or positional relationship in which the product of the present application is customarily placed in use, or as customarily understood by those skilled in the art, solely for the purpose of facilitating the description of the present application and simplifying the description, but do not indicate or imply that the apparatuses or elements referred to must have a particular orientation, be constructed and operate in a particular orientation, and therefore cannot be construed as a limitation of the present application. In addition, the terms "first", "second" and "third" are only used to distinguish the description, and cannot be construed as indicating or implying relative importance.

The term "a plurality of" as used in the present application refers to more than two (including two).

The electrode sheet referred to in the embodiments of the present application comprises a current collector and an active material layer coated on the surface of the current collector, wherein the active material layer is coated on part of the region of the current collector, the current collector not coated with the active material layer protrudes from the current collector coated with the active material layer, and the current collector not coated with the active material layer serves as the tab of the electrode sheet. The electrode sheet may be a positive electrode sheet or a negative electrode sheet. If the electrode sheet is a positive electrode sheet, the positive electrode sheet comprises a positive electrode current collector and a positive electrode active material layer, wherein the positive electrode active material layer is coated on a surface of the positive electrode current collector, the part of the positive electrode current collector not coated with the positive electrode active material layer protrudes from the part of the positive electrode current collector already coated with the positive electrode active material layer, and the part of the positive electrode current collector not coated with the positive electrode active material layer serves as a positive electrode tab. Taking a lithium-ion battery as an example, the material of the positive electrode current collector may be aluminum, and the positive electrode active material may be lithium cobalt oxide, lithium iron phosphate, ternary lithium, lithium manganate, or the like. If the electrode sheet is a negative electrode sheet, the negative electrode sheet comprises a negative electrode current collector and a negative electrode active material layer, wherein the negative electrode active material layer is coated on a surface of the negative electrode current collector, the part of the negative electrode current collector not coated with the negative electrode active material layer protrudes from the part of the negative electrode current collector already coated with the negative electrode active material layer, and the part of the negative electrode current collector not coated with the negative electrode active material layer serves as a negative electrode tab. The material of the negative electrode current collector may be copper, and the negative electrode active material may be carbon, silicon, or the like.

Various factors need to be taken into consideration in the manufacturing of the electrode sheet to ensure the molding quality of the electrode sheet, such as the coating weight, the coating density, the coating thickness, the precision of belt-conveying, and other factors, and in addition to that, the quality of oven drying of the active material layer of the electrode sheet also needs to be taken into consideration.

The main factors that affect the quality of oven drying of the active material layer of the electrode sheet comprise the uniformity of heating, insufficient heating, and excessive heating. If the electrode sheet is subjected to non-uniform heating, there will be non-uniform dehydration of the electrode, which will lead to non-uniform thickness of the electrode sheet, and lithium plating will occur due to non-uniform force when the electrode assembly is heated and expanded, thus affecting the electrical performance and safety performance of the battery. If the electrode sheet is not heated sufficiently, the water content of the active material layer is too high, which will affect the electrical conductivity. If the electrode sheet is overheated, the active material layer will be easily cracked and fall off.

This has a significant impact on the quality of oven drying of the electrode sheet. The inventors found that in the prior art, as shown in FIG. 1, the oven dryer 1 has a plurality of air inlet nozzles 1a arranged side by side, wherein each air inlet nozzle 1a directly faces the active material layer of the electrode sheet 1c and sends wind to the electrode sheet 1c, and when the wind sent from the air inlet nozzle 1a acts on the electrode sheet 1c, it will spread in all directions taking the vertical point of action between the wind and the electrode sheet 1c as the center. The pointing of the solid arrow in FIG. 1 is a view of the flow direction of the wind from the air inlet nozzle 1a after acting on the electrode sheet 1c. The wind from the air inlet nozzle 1a will form a convergence region 1b between two adjacent air inlet nozzles 1a after acting on the electrode sheet 1c, and because the wind flows with heat, the heat in the convergence region 1b between the two adjacent air inlet nozzles 1a will be higher than the heat in other positions, so that the active material layer corresponding to the convergence region 1b is heated to a greater extent than other locations, resulting in non-uniform heating of the active material layer of the electrode sheet 1c, and even in excessive heating of the active material layer corresponding to the convergence region 1b.

On this basis, embodiments of the present application provide a technical solution in which, by setting at least one air return portion between two adjacent first air inlet portions, fluid medium in the oven drying chamber can be discharged via the air return portion, and the heat between the two adjacent first air inlet portions is taken away by discharging the fluid medium via the air return portion, thus avoiding accumulation of heat between the two first air inlet portions and improving the heating uniformity of the to-be-oven-dried member.

The technical solution described in the embodiments of the present application applies to the coating device 1000 and other products that require the use of oven drying technology or heating technology.

Figure 2:
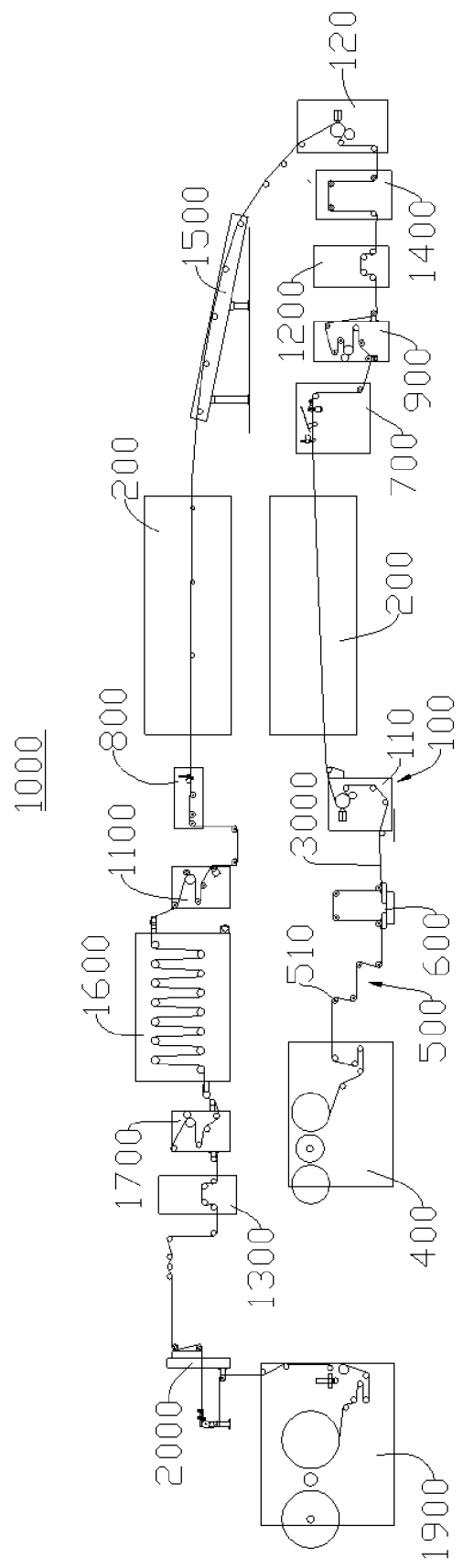
FIG. 2 is a schematic structural view of a coating device provided in some embodiments of the present application.

As shown in FIG. 2, the coating device 1000 provided in some embodiments of the present application comprises a coating apparatus 100 and an oven drying apparatus 200. The coating apparatus 100 is used for coating the surface of the substrate 3000 to form a coating on the surface of the substrate 3000. The oven drying apparatus 200 is used for oven-drying the coating coated on the substrate 3000.

Embodiments of the present application describes relevant structures taking the coating device 1000 for use in coating to form an electrode sheet as an example. Thus, the substrate 3000 may be a current collector, and the coating formed by the coating apparatus 100 by coating the surface of the substrate 3000 may be an active material layer. Depending on the polarity of the electrode sheet, the material of the current collector and the material of the active material layer are different. If what is formed by the coating device 1000 is a positive electrode sheet, the material of the current collector may be aluminum, and the active material may be lithium cobalt oxide, lithium iron phosphate, ternary lithium, lithium manganate, or the like. If what is formed by the coating device 1000 is a negative electrode sheet, the material of the current collector may be copper and the active material may be carbon or silicon, or the like.

The substrate 3000 has opposing first and second surfaces along the thickness direction of the substrate 3000, and the coating apparatus 100 is used for coating the first and second surfaces to form coatings on the first and second surfaces.

In some embodiments, the coating apparatus 100 comprises a first coating mechanism 110 and a second coating mechanism 120, the second coating mechanism 120 being disposed downstream of the first coating mechanism 110, and the first coating mechanism 110 being configured to coat the first surface of the substrate 3000 and the second coating mechanism 120 being configured to coat the second surface of the substrate 3000. The coating apparatus 100 comprises two coating mechanisms, i.e., the first coating mechanism 110 and the second coating mechanism 120, that coat the first and second surfaces, respectively, which enable improved efficiency of coating and thus higher efficiency of production.

The coating device 1000 comprises two oven drying apparatuses 200, one of the two oven drying apparatuses 200 being disposed downstream of the first coating mechanism 110 and located upstream of the second coating mechanism 120 to oven dry the coating on the first surface, and the other of the two oven drying apparatuses 200 being located downstream of the second coating mechanism 120 to oven dry the coating on the second surface. One of the two oven drying apparatuses 200 is used for oven drying the coating on the first surface of the substrate 3000 and the other is used for oven drying the coating on the second surface of the substrate 3000, thereby improving the uniformity of heating of the substrate 3000.

It should be noted that "upstream" and "downstream" mentioned above and below in the embodiments of the present application refer to the order of production, wherein upstream means coming earlier in the production order and downstream means coming later in the production order, rather than limiting the spatial locations among the components.

With continued reference to FIG. 2, in some embodiments, the coating device 1000 further comprises an unwinding apparatus 400, wherein the unwinding apparatus 400 is disposed upstream of the first coating mechanism 110 and the unwinding apparatus 400 is used for automatic unwinding and belt-conveying of the substrate 3000.

In some embodiments, the coating device 1000 further comprises a first pass roller assembly 500, wherein the first pass roller assembly 500 is disposed downstream of the unwinding apparatus 400 and disposed upstream of the first coating mechanism 110. The first pass roller assembly 500 comprises a plurality of first pass rollers 510 arranged in rotation, and the substrate 3000 is wrapped around the plurality of first pass rollers 510 in sequence, and the first pass roller assembly 500 is used to support the substrate 3000 and achieve drive of the substrate 3000.

Due to manufacturing errors and mounting errors of the device, there may possibly be deviation of the position of the substrate 3000 in the direction of belt-conveying of the substrate 3000, which causes deviation in the relative position of the substrate 3000 and the coating apparatus 100, resulting in insufficient precision of coating by the coating apparatus 100 on the substrate 3000.

In some embodiments, the coating device 1000 further comprises an unwinding deviation rectification apparatus 600, wherein the unwinding deviation rectification apparatus 600 is disposed downstream of the unwinding apparatus 400 and disposed upstream of the first coating mechanism 110, and the unwinding deviation rectification apparatus 600 can receive the substrate 3000 and adjust the position of the substrate 3000 so that the substrate 3000 can be always located within the coating range of the first coating mechanism 110, thereby ensuring the coating precision of the first surface of the substrate 3000 by the first coating mechanism 110.

Due to the existence of manufacturing errors and mounting errors of the device, as well as the possible deviation of the position of the substrate 3000 and the possible wrinkling of the substrate 3000 during oven drying of the first and second surfaces of the substrate 3000, the deviation of the direction of the relative position of the substrate 3000 to the other apparatuses is caused.

On this basis, in some embodiments, the coating device 1000 further comprises a first outlet deviation rectification apparatus 700, wherein the first outlet deviation rectification apparatus 700 is disposed downstream of the oven drying apparatus 200 downstream of the first coating mechanism 110 and disposed upstream of the second coating mechanism 120, and the first outlet deviation rectification apparatus 700 can receive the substrate 3000 of which the coating on the first surface is dried and adjust the position of the substrate 3000, so that the substrate 3000 can always be located within the coating range of the second coating mechanism 120, thereby ensuring the coating precision of the second surface of the substrate 3000 by the second coating mechanism 120. The first outlet deviation rectification apparatus 700 also enables spreading and wrinkle removal of the substrate 3000 of which the first surface is coated with a coating, so as to maintain the flatness of the coated substrate 3000.

In some embodiments, the coating device 1000 further comprises a second outlet deviation rectification apparatus 800, wherein the second outlet deviation rectification apparatus 800 is disposed downstream of the oven drying apparatus 200 downstream of the second coating mechanism 120, and the second outlet deviation rectification apparatus 800 can receive the substrate 3000 of which the coating on the second surface has been oven-dried and adjust the position of the substrate 3000. The second outlet deviation rectification apparatus 800 also enables spreading and wrinkle removal of the substrate 3000 of which the first and second surfaces are both coated with coatings, so as to maintain the flatness of the coated substrate 3000.

There are many processes for forming the electrode sheet and the drive path of the substrate 3000 is long, and in the drive path of the substrate 3000, there is a possibility of non-uniform tension on the substrate 3000.

In some embodiments, the coating device 1000 further comprises a first traction apparatus 900, wherein the first traction apparatus 900 is disposed downstream of the first outlet deviation rectification apparatus 700 and located upstream of the second coating mechanism 120, the first traction apparatus 900 is used to tract the substrate 3000 from the first outlet deviation rectification apparatus 700 to the second coating mechanism 120, and the first traction apparatus 900 is further used to form a tension separation between the first outlet deviation rectification apparatus 700 and the second coating mechanism 120, thereby ensuring tension balance during the conveying of the substrate 3000.

In some embodiments, the coating device 1000 further comprises a second traction apparatus 1100, wherein the second traction apparatus 1100 is disposed downstream of the second outlet deviation rectification apparatus 800, and the second traction apparatus 1100 is used to tract the substrate 3000 from the second outlet deviation rectification apparatus 800 to the next station, and the second traction apparatus 1100 is further used to form a tension separation between the second outlet deviation rectification apparatus 800 and the next station, thereby ensuring tension balance during the conveying of the substrate 3000.

To ensure the quality of coating, in some embodiments, the coating device 1000 further comprises a first surface density measurement apparatus 1200, wherein the first surface density measurement apparatus 1200 is disposed downstream of the first coating mechanism 110 and located upstream of the second coating mechanism 120, and the first surface density measurement apparatus 1200 is used to achieve real-time monitoring of the surface density of the coating on the first surface, and can be communicatively connected to the first coating mechanism 110 to realize closed loop control of the coating weight.

The first surface density measurement apparatus 1200 may be disposed downstream of the first coating mechanism 110 and located upstream of the oven drying apparatus 200 for oven drying the coating on the first surface, so that the first surface density measurement apparatus 1200 is used to detect the surface density of the coating on the first surface before oven drying. The first surface density measurement apparatus 1200 may also be disposed downstream of the oven drying apparatus 200 for oven drying the coating on the first surface and located upstream of the second coating mechanism 120, so that the first surface density measurement apparatus 1200 is used to detect the surface density of the coating on the first surface after oven drying.

In some embodiments, the coating device 1000 further comprises a second surface density measurement apparatus 1300, wherein the second surface density measurement apparatus 1300 is disposed downstream of the second coating mechanism 120, and the second surface density measurement apparatus 1300 is used to achieve real-time monitoring of the surface density of the coating on the second surface, and can be communicatively connected to the second coating mechanism 120 to realize closed loop control of the coating weight.

The second surface density measurement apparatus 1300 may be disposed downstream of the second coating mechanism 120 and located upstream of the oven drying apparatus 200 for oven drying the coating on the second surface, so that the second surface density measurement apparatus 1300 is used to detect the surface density of the coating on the second surface before oven drying. The second surface density measurement apparatus 1300 may also be disposed downstream of the oven drying apparatus 200 for oven drying the coating on the second surface, so that the second surface density measurement apparatus 1300 is used to detect the surface density of the coating on the second surface before oven drying.

In some embodiments, the coating device 1000 further comprises a head deviation rectification apparatus 1400, wherein the head deviation rectification device is disposed downstream of the first surface density measurement apparatus 1200 and upstream of the second coating mechanism 120, and the head deviation rectification apparatus 1400 is used to adjust the position of the substrate 3000 before the second coating mechanism 120 coats the second surface of the substrate 3000, and can also achieve closed loop control of the adjustment of the position of the substrate 3000 with a CCD (Charge-coupled Device) measurement system.

Because there are many processes for forming the electrode sheet and the substrate 3000 is long, the coating device 1000 has a large footprint. To avoid arranging the individual apparatuses of the coating device 1000 in one direction, in some embodiments, the coating device 1000 is arranged in two rows side by side. As shown in FIG. 2, the apparatuses upstream of the second coating mechanism 120 are arranged in the lower row and the apparatuses downstream of the second coating mechanism 120 are arranged in the upper row. To enable the substrate 3000 to be conveyed steadily from the lower row to the upper row, the coating device 1000 further comprises a climbing apparatus 1500, wherein the climbing apparatus 1500 is disposed downstream of the second coating mechanism 120 and upstream of the oven drying apparatus 200 for oven drying the coating on the second surface of the substrate 3000. The climbing apparatus 1500 is used to support the substrate 3000 and to tract the substrate 3000 from the second coating mechanism 120 to the oven drying apparatus 200 for oven drying the coating on the second surface, so that the substrate 3000 can be steadily conveyed from the second coating mechanism 120 to the oven drying apparatus 200 for oven drying the coating on the second surface.

Since the coating on the first surface and the coating on the second surface of the substrate 3000 are oven dried by their respective corresponding oven drying apparatuses 200, respectively, and the coating on the first surface is oven dried first and the coating on the second surface is then oven dried, the coating on the first surface will be oven dried again while the coating on the second surface is being oven dried, that is, the coating on the first surface is oven dried twice, so that the coating on the first surface and the coating on the second surface are oven dried to different degrees, thus resulting in non-uniform oven drying. On this basis, in some embodiments, the coating device 1000 further comprises a heating apparatus 1600, wherein the heating apparatus 1600 is disposed downstream of the oven drying apparatus 200 located downstream of the second coating mechanism 120, and the heating apparatus 1600 is configured to oven dry the coating on the second surface. The heating apparatus 1600 is capable of oven drying the coating on the second surface for a second time so that the degrees of oven drying of the coating on the first surface and the coating on the second surface tend to be consistent, thus reducing the difference in oven drying between the coating on the first surface and the coating on the second surface.

In some embodiments, the heating apparatus 1600 is disposed downstream of the second traction apparatus 1100, and the second traction apparatus 1100 is used to tract the substrate 3000 from the second outlet deviation rectification apparatus 800 to the heating apparatus 1600 to enable the heating apparatus 1600 to oven dry the coating on the second surface for a second time.

In some embodiments, the coating device 1000 further comprises a cooling and traction apparatus 1700, wherein the cooling and traction apparatus 1700 is disposed downstream of the heating apparatus 1600 to perform traction and conveying and sheet cooling of the substrate 3000 that has been dried by the heating apparatus 1600, thereby ensuring that the substrate 3000 coated with the coating is conveyed without being wrinkled.

In some embodiments, in the case where the second surface density measurement apparatus 1300 is disposed upstream of the heating apparatus 1600, the coating device 1000 further comprises a third surface density measurement apparatus (not shown in the figure), wherein the third surface density measurement apparatus is disposed downstream of the heating apparatus 1600, and the third surface density measurement apparatus is used to achieve real-time monitoring of the surface density of the coating on the second surface after oven drying is performed for the second time, and can be communicatively connected to the second coating mechanism 120 to realize closed loop control of the coating weight. Here, the situation where the second surface density measurement apparatus 1300 is disposed upstream of the heating apparatus 1600 comprises the case where: the second surface density measurement apparatus 1300 is disposed downstream of the oven drying apparatus 200 for oven drying the coating on the second surface of the substrate 3000 and located upstream of the heating apparatus 1600, or the second surface density measurement apparatus 1300 is disposed upstream of the oven drying apparatus 200 for oven drying the coating on the second surface of the substrate 3000 and is located downstream of the second coating mechanism 120.

Referring to FIG. 2, in some embodiments, the coating device 1000 may also not be provided with the third surface density measurement apparatus, but dispose the second surface density measurement apparatus 1300 downstream of the heating apparatus 1600, wherein the second surface density measurement apparatus 1300 is used to achieve real-time monitoring of the surface density of the coating on the second surface after oven drying is performed for the second time, and can be communicatively connected to the second coating mechanism 120 to realize closed loop control of the coating weight.

In some embodiments, the coating device 1000 further comprises a rewinding apparatus 1900, wherein the rewinding apparatus 1900 is disposed downstream of the second surface density measurement apparatus 1300, and the rewinding apparatus 1900 is used for automatic rewinding and automatic winding-replacing for the substrate 3000 of which the first and second surfaces are both coated with coatings.

In some embodiments, the coating device 1000 further comprises a rewinding deviation rectification apparatus 2000, wherein the rewinding deviation rectification apparatus 2000 is disposed downstream of the second surface density measurement apparatus 1300, and the rewinding deviation rectification apparatus 2000 is used to adjust the position of the substrate 3000 before the rewinding apparatus 1900 rewinds the substrate 3000.

Figure 3:
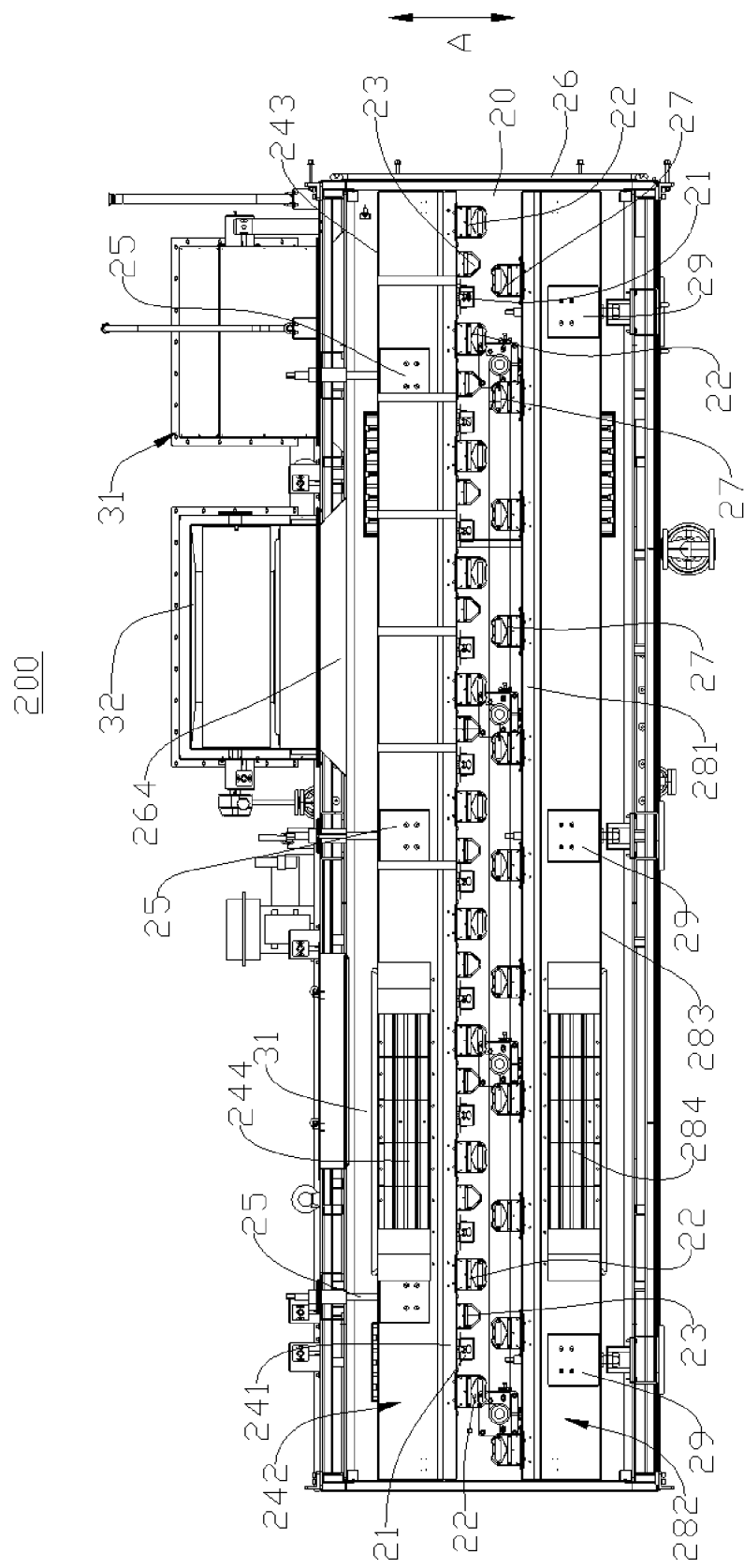
FIG. 3 is a schematic structural view of an oven drying apparatus provided in some embodiments of the present application.
Figure 4:
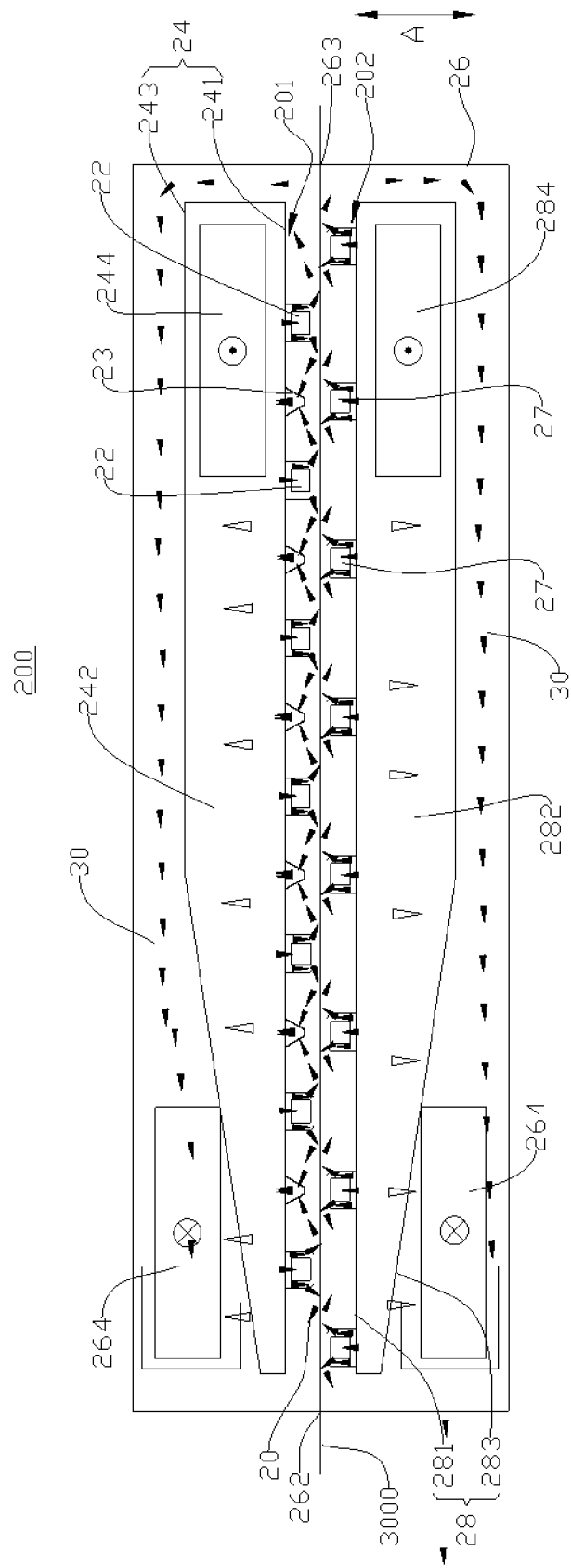
FIG. 4 is a structural diagram of a first point of view of an oven drying apparatus provided in some embodiments of the present application.

As shown in FIGS. 3 and 4, in some embodiments, the oven drying apparatus 200 comprises an oven drying chamber 20 and a heating assembly 21. The oven drying chamber 20 is used for accommodating a to-be-oven-dried member, the oven drying chamber 20 having a first oven drying side 201 facing the to-be-oven-dried member, with the first oven drying side 201 having a plurality of first air inlet portions 22 for fluid medium to enter the oven drying chamber 20. The heating assembly 21 is disposed on the first oven drying side 201, the heating assembly 21 being configured to oven-dry the to-be-oven-dried member. Here, the first oven drying side 201 is further provided with an air return portion 23, at least one air return portion 23 being provided between two adjacent first air inlet portions 22, and the air return portion 23 being configured for fluid medium in the oven drying chamber 20 to be discharged from the oven drying chamber 20.

In the embodiments of the present application, the fluid medium is gas, such as external air, protective gas, and so on.

At least one air return portion 23 is disposed between two adjacent first air inlet portions 22, and as shown in FIG. 2, one air return portion 23 is disposed between two adjacent first air inlet portions 22. In some other embodiments, other numbers of, such as two or more, air return portions 23 may be disposed between two adjacent first air inlet portions 22.

The air return portions 23 can discharge fluid medium in the oven drying chamber 20 from the oven drying chamber 20. When fluid medium is provided to the oven drying chamber 20 via the two adjacent first air inlet portions 22, the fluid medium is guided between the two first air inlet portions 22 by the to-be-oven-dried member after it acts on the to-be-oven-dried member, so that the heat carried by the fluid medium accumulates between the two first air inlet portions 22, which causes the corresponding portion between the two adjacent first air inlet portions 22 to be overheated, thus leading to non-uniform heating of various parts of the to-be-oven-dried member, and the arrangement of the air return portion 23 between the two first air inlet portions 22 can discharge the fluid medium between the two first air inlet portions 22 and take away the heat, thus avoiding accumulation of heat between the two first air inlet portions 22 and improving the heating uniformity of the to-be-oven-dried member.

The first air inlet portions 22 may be air nozzles, air supply ports, etc., and the air return portions 23 may be air nozzles, air extraction ports, etc. When the first air inlet portions 22 are air nozzles, the first air inlet portions 22 may be extended into the oven drying chamber 20 to reduce the distances from the substrate 3000.

As shown in FIGS. 3 and 4, the first oven drying side 201 of the oven drying chamber 20 is located on the side of the thickness direction of the substrate 3000, and a plurality of first air inlet portions 22 are arranged at intervals on the first air inlet side.

To further reduce the accumulation of heat between two adjacent first air inlet portions 22, in some embodiments, the air return portion 23 is disposed at the intermediate position of the two adjacent first air inlet portions 22. In other words, the distance between one of the two first air inlet portions 22 and the air return portion 23 is equal to the distance between the other of the two first air inlet portions 22 and the air return portion 23, which is conducive to improving the uniformity of heat distribution in the oven drying chamber 20.

In order to make the heat distributed as uniformly as possible in the oven drying chamber 20, at least one heating assembly 21 is disposed between the two adjacent first air inlet portions 22. so that the first air inlet portions 22 can bring the heat of the heating assembly 21 to each position of the oven drying chamber 20 with the flow of the fluid medium when providing fluid medium to the oven drying chamber 20, which improves the uniformity of heat distribution, thereby improving the heating uniformity of the to-be-oven-dried member.

In some embodiments, the oven drying apparatus 200 comprises a first wall 241 facing the to-be-oven-dried member in the first direction A. The first air inlet portions 22, the heating assembly 21, and the air return portion 23 are all disposed on the first wall 241, and the first air inlet portions 22, the heating assembly 21, and the air return portion 23 are all disposed on the side of the first wall 241 facing the oven drying chamber 20. The oven drying apparatus 200 further comprises a first drive unit 25, the first drive unit 25 being configured to adjust the distance between the first wall 241 and the to-be-oven-dried member in the first direction A. The first drive unit 25 is capable of driving the first wall 241 provided with the first air inlet portions 22, the heating assembly 21, and the air return portion 23 to move to adjust the distance between the first wall 241 and the to-be-oven-dried member in the first direction A, so as to adjust the distance between the heating assembly 21 and the to-be-oven-dried member to meet different heating needs and improve the quality of heating.

It should be noted that in the embodiments of the present application, the structure related to the coating device 1000 is presented taking the oven drying of the coating on the surface of the substrate 3000 as an example. Thus, the surface of the to-be-oven-dried member is coated with the coating on the substrate 3000, and in other embodiments, the to-be-oven-dried member may also be of other structures.

The first drive unit 25 may be a linear drive mechanism such as an adjusting screw, a linear motor, an air cylinder, and so on. The first drive unit 25 drives the first wall 241 to move reciprocally along the first direction A to move the first wall 241 close to or away from the substrate 3000, so that the first air inlet portions 22, the heating assembly 21, and the air return portion 23 are close to or away from the substrate 3000. There may be a plurality of first drive unit 25 disposed at intervals to be able to adjust the distance between the first wall 241 and the substrate 3000 along the first direction A from a plurality of positions. In particular, in the case where the dimensions of the first wall 241 in the length direction and/or the width direction are large, the first wall 241 is driven by the plurality of first drive units 25 to move along the first direction A, which enables the distance between each position of the first wall 241 in the length direction and/or width direction and the substrate 3000 in the first direction A to be the same, thereby reducing the difference in the distance between each position of the substrate 3000 and the first air inlet portions 22, the heating assembly 21, and the air return portion 23 in the first direction A, which improves the heating uniformity and thus the product quality.

In some embodiments, the oven drying apparatus 200 further comprises a first air inlet chamber 242, wherein the first air inlet chamber 242 is separated from the oven drying chamber 20 by the first wall 241, and the first air inlet portions 22, the heating assembly 21, and the air return portion 23 are all disposed in the first wall 241, wherein the first air inlet portions 22 are used for the fluid medium in the first air inlet chamber 242 to enter the oven drying chamber 20. The fluid medium, after entering the first air inlet chamber 242, enters the oven drying chamber 20 via the plurality of first air inlet portions 22, so that the fluid medium can be uniformly distributed in the oven drying chamber 20, thereby improving the heating uniformity of the to-be-oven-dried member. The first air inlet chamber 242 and the oven drying chamber 20 share the first wall 241 and are separated by the first wall 241, which can reduce the volume of the oven drying apparatus 200.

The oven drying apparatus 200 further comprises an outer box 26, and the oven drying chamber 20 and the first air inlet chamber 242 are both disposed in the outer box 26.

In some embodiments, the oven drying apparatus 200 comprises a first wind box 24, wherein the first wind box 24 is formed with the first air inlet chamber 242 in the interior, and the first wind box 24 comprises the first wall 241 and a first box body 243 having a first opening, the first wall 241 covering the first opening so that the first wall 241 and the first box body 243 jointly define the first air inlet chamber 242. The first air inlet chamber 242 is in communication with the interior of the outer box 26 via the first air inlet portions 22. The first drive unit 25 is mounted in the outer box 26, and the first drive unit 25 enables the first wall 241 to move in the first direction A by driving the first wind box 24 to move inside the outer box 26 in the first direction A.

The first wind box 24 is also provided with a first air supply port 244, wherein the first air supply port 244 is in communication with the first air inlet chamber 242, and fluid medium is provided to the first air inlet chamber 242 via the first air supply port 244, and the fluid medium entering the first air inlet chamber 242 then enters the oven drying chamber 20 via the first air inlet portions 22.

The first air inlet chamber 242 and the oven drying chamber 20 may also be formed in other forms. For example, the first air inlet chamber 242 may be defined and formed jointly by the surface of the first wall 241 back from the to-be-oven-dried member and the inner wall of the outer box 26, two ends of the first wall 241 are slidably disposed in the outer box 26, the first drive unit 25 is mounted in the outer box 26, and the first drive unit 25 drives the first wall 241 to slide along the first direction A with respect to the outer box 26. The surface of the first wall 241 facing the substrate 3000 and the inner wall of the outer box 26 jointly define the oven drying chamber 20, and the first drive unit 25 drives along the first direction A the first wall 241 to move, which can not only adjust the distance between the first wall 241 and the substrate 3000, but also adjust the sizes of the first air inlet chamber 242 and the oven drying chamber 20, wherein, when the first air inlet chamber 242 gradually becomes smaller, the oven drying chamber 20 gradually becomes larger, and vice versa, when the first air inlet chamber 242 gradually becomes larger, the oven drying chamber 20 gradually becomes smaller.

In some embodiments, the oven drying chamber 20 further has a second oven drying side 202 arranged opposite to the first oven drying side 201 in the first direction A, the second oven drying side 202 being provided with a plurality of second air inlet portions 27 for fluid medium to enter the oven drying chamber 20. The second air inlet portions 27 enable the fluid medium enter the oven drying chamber 20 from the second oven drying side 202 of the oven drying chamber 20, which can speed up the flow of the fluid medium in the oven drying chamber 20, thus speeding up the flow of heat in the oven drying chamber 20 to make the heat uniformly distributed inside the oven drying chamber 20, thus improving the heating uniformity of the to-be-oven-dried member.

The second oven drying side 202 is located on the side of the substrate 3000 back from the first oven drying side 201. The second air inlet portions 27 may be air nozzles, air supply ports, and so on. When the second air inlet portions 27 are air nozzles, the second air inlet portions 27 may extend into the oven drying chamber 20 to reduce the distances from the substrate 3000.

In some embodiments, the oven drying apparatus 200 comprises a first wall 241 facing the to-be-oven-dried member in the first direction A and a second wall 281 arranged opposite to the first wall 241, the first air inlet portions 22, the heating assembly 21, and the air return portion 23 being all disposed on the first wall 241 and the second air inlet portions 27 being disposed on the second wall 281; and the oven drying chamber 20 being located between the first wall 241 and the second wall 281 in the first direction A; and the oven drying apparatus 200 further comprises a second drive unit 29, the second drive unit 29 being configured to drive the second wall 281 to move to adjust the distance between the second wall 281 and the first wall 241 in the first direction A. The second drive unit 29 can drive the second wall 281 to move to adjust the distance between the second wall 281 and the first wall 241 in the first direction A, so as to adapt to the to-be-oven-dried members having different sizes along the first direction.

The second drive unit 29 may be a linear drive mechanism such as an adjusting screw, a linear motor, an air cylinder, and so on. The second drive unit 29 drives the second wall 281 to move reciprocally along the first direction A to move the second wall 281 close to or away from the substrate 3000 or the first wall 241, thereby adjusting the distance between the second air inlet portions 27 and the substrate 3000 or the distance between the second wall 281 and the first wall 241. There may be a plurality of second drive units 29 disposed at intervals to be able to adjust the second wall 281 along the first direction A from a plurality of positions. In particular, in the case where the dimensions of the second wall 281 in the length direction and/or the width direction are large, the second wall 281 is driven by the plurality of second drive units 29 to move along the first direction A, which enables the distance between each position of the second wall 281 in the length direction and/or width direction and the substrate 3000 in the first direction A to be the same, which reduces the difference in the distance between each position of the substrate 3000 and the second air inlet portions 27 in the first direction A, thereby improving the heating uniformity and thus the product quality.

In some embodiments, the oven drying apparatus 200 comprises a second wind box 28, wherein the second wind box 28 is formed with the second air inlet chamber 282 in the interior, and the second wind box 28 comprises the second wall 281 and a second box body 283 having a second opening, the second wall 281 covering the second opening so that the second wall 281 and the second box body 283 jointly define the second air inlet chamber 282. The second air inlet chamber 282 is in communication with the interior space of the outer box 26 via the second air inlet portions 27. The second drive unit 29 is mounted in the outer box 26, and the second drive unit 29 enables the second wall 281 to move in the first direction A by driving the second wind box 28 to move inside the outer box 26 in the first direction A.

The second wind box 28 is also provided with a second air supply port 284, wherein the second air supply port 284 is in communication with the second air inlet chamber 282, and fluid medium is provided to the second air inlet chamber 282 via the second air supply port 284, and the fluid medium entering the second air inlet chamber 282 then enters the oven drying chamber 20 via the second air inlet portions 27.

The second air inlet chamber 282 may also be formed in other forms. For example, the second air inlet chamber 282 may be defined and formed jointly by the surface of the second wall 281 back from the to-be-oven-dried member and the inner wall of the outer box 26, two ends of the second wall 281 are slidably disposed in the outer box 26 along the first direction A, the second drive unit 29 is mounted in the outer box 26, and the second drive unit 29 drives the second wall 281 to slide along the first direction A with respect to the outer box 26. The first drive unit 25 drives along the first direction A the second wall 281 to move, which can not only adjust the distance between the second wall 281 and the substrate 3000, but also adjust the sizes of the second air inlet chamber 282 and the oven drying chamber 20, wherein, when the second air inlet chamber 282 gradually becomes smaller, the oven drying chamber 20 gradually becomes larger, and vice versa, when the second air inlet chamber 282 gradually becomes larger, the oven drying chamber 20 gradually becomes smaller.

The outer box 26 is also provided with a first inlet 262 for the substrate 3000 to reach into the outer box 26 and a first outlet 263 for the substrate 3000 to reach out of the outer box 26. Both the first inlet 262 and the first outlet 263 are in communication with the interior of the outer box 26, and the heating assembly 21 oven dries the coating on the substrate 3000 during the process in which the substrate 3000 reaches into the outer box 26 via the first inlet 262 and reaches out of the outer box 26 via the first outlet 263.

In some embodiments, the oven drying apparatus 200 may comprise only the first air inlet chamber 242 and the oven drying chamber 20.

The fluid medium needs to be pre-heated before entering the oven drying chamber 20, so as to avoid a great temperature difference between the fluid medium entering the oven drying chamber 20 via the first air inlet portions 22 and the second air inlet portions 27 and the fluid medium inside the oven drying chamber 20 that causes a large impact on the oven drying temperature inside the oven drying chamber 20.

In some embodiments, the oven drying apparatus 200 further comprises an air return chamber 30 and a circulation unit 31, the air return chamber 30 being configured to accommodate fluid medium discharged from the air return portion 23 and the circulation unit 31 being configured to import fluid medium in the air return chamber 30 into the first air inlet chamber 242.

The fluid medium discharged from the air return portions 23 can be accommodated in the air return chamber 30 and then enter the first air inlet chamber 242 under the action of the circulation unit 31, so that it can enter the oven drying chamber 20 via the first air inlet portions 22, which allows the recycle use of heat generated by the heating assembly 21 in the oven drying chamber 20, thus reducing energy consumption. The solid arrows in FIG. 4 point to the flow path in which the fluid medium entering the oven drying chamber 20 through the first air inlet portions 22 acts on the substrate 3000 and the air return portion 23 in sequence and finally passes through the air return chamber 30 and gets discharged through the first air discharge port 264 on the outer box 26. The hollow arrows point to the path in which the fluid medium inside the outer box 26 is discharged directly through the first air discharge port 264.

In some embodiments, the outer box 26 is also provided with the first air discharge port 264 in communication with the interior of the outer box 26, and the oven drying apparatus 200 further comprises a first air discharge unit 32, wherein the first air discharge unit 32 is used to discharge fluid medium inside the outer box 26 via the first air discharge port 264, and in the process of discharging the fluid medium inside the outer box 26 by the first air discharge unit 32, the fluid medium is discharged carrying the solvent evaporated from the oven drying of the coating of the substrate 3000, thereby reducing the weight loss ratio.

In some embodiments, the air return chamber 30 is defined jointly by the outer wall of the first box body 243, the outer wall of the second box body 283, and the inner wall of the outer box 26. The air return chamber 30 is in communication with the oven drying chamber 20, and the fluid medium in the oven drying chamber 20 can enter the air return chamber 30 directly or enter the air return chamber 30 via the air return portion 23, and the fluid medium entering the air return chamber 30 enters the first air inlet chamber 242 and/or the second air inlet chamber 282 under the drive of the circulation unit 31. In some embodiments, the circulation unit 31 can cause the fluid medium in the air return chamber 30 to be discharged via the first air discharge port 264 and then imported into the oven drying chamber 20 again via the first air inlet portions 22.

Figure 5:
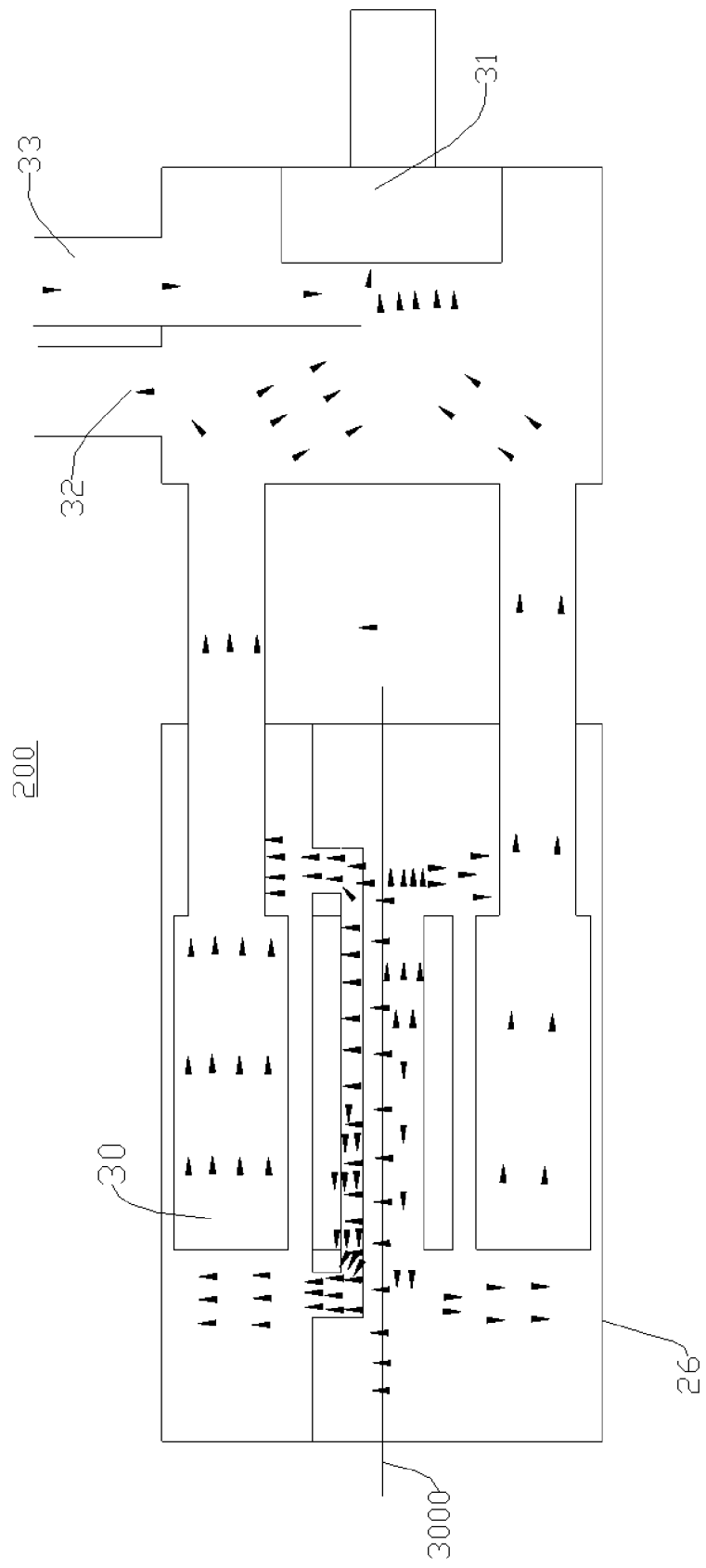
FIG. 5 is a structural diagram of a second point of view of an oven drying apparatus provided in some embodiments of the present application.

As shown in FIG. 5, in some embodiments, the oven drying apparatus 200 further comprises a first fresh air port 33, and the circulation unit 31 draws fresh air from the outside via the first fresh air port 33 and sends the fresh air via the first air supply port 244 and the second air supply port 284 into the first air inlet chamber 242 and the second air inlet chamber 282. In some embodiments, the oven drying apparatus 200 further comprises a first pre-heating assembly 35, wherein the fresh air passes through the first pre-heating assembly 35 before being sent into the first air inlet chamber 242 and the second air inlet chamber 282 by the circulation unit 31, and the first pre-heating assembly 35 pre-heats the fresh air to avoid a great temperature difference between the fresh air and the fluid medium in the oven drying chamber 20 that causes a large impact on the oven drying temperature inside the oven drying chamber 20.

Figure 6:
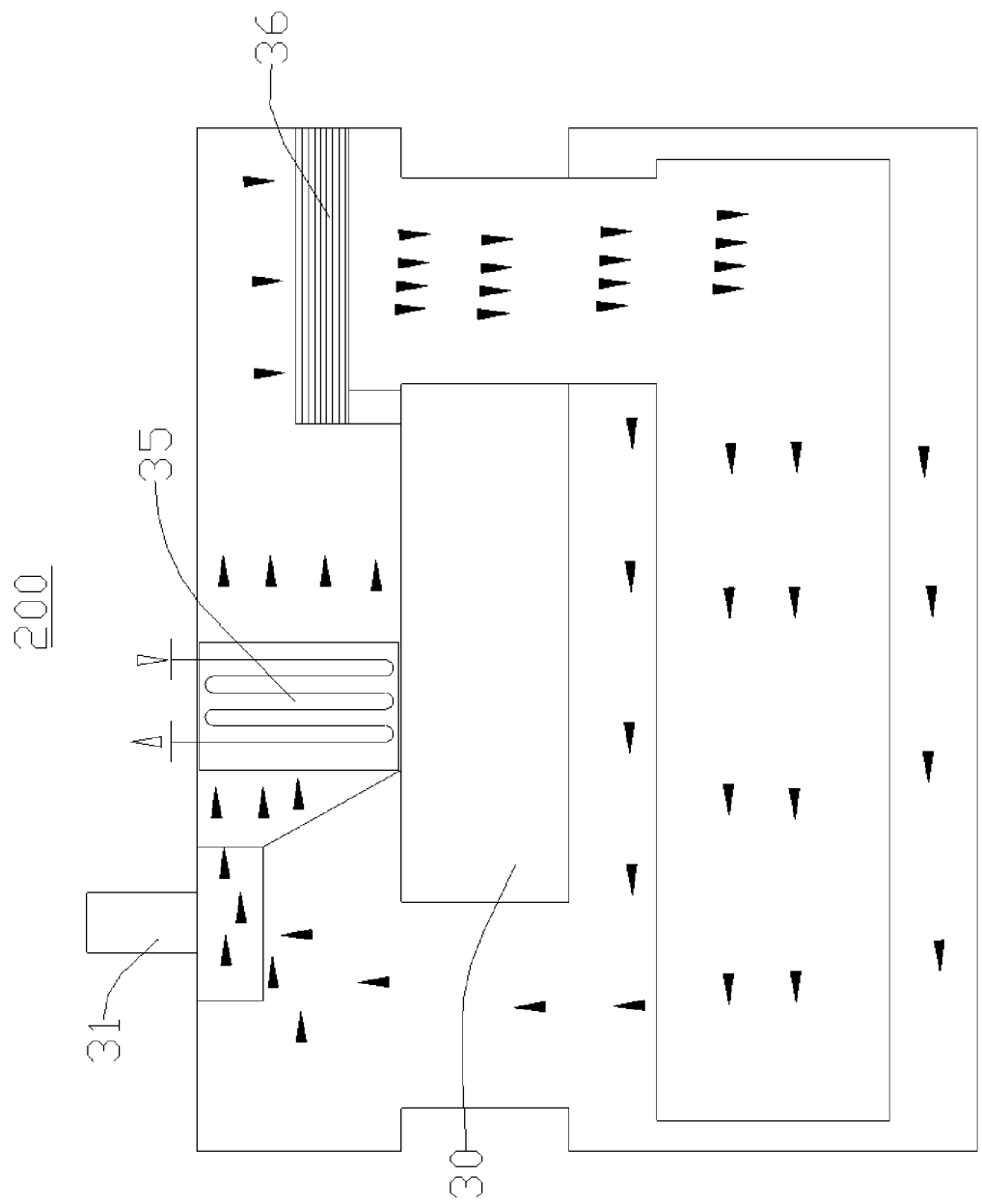
FIG. 6 is a schematic structural view of a third point of view of an oven drying apparatus provided in some embodiments of the present application.

As shown in FIG. 6, in some embodiments, the oven drying apparatus 200 further comprises a filtering mechanism 36, wherein the filtering mechanism 36 is used to filter the fluid medium before the fluid medium enters the first air inlet chamber 242 and the second air inlet chamber 282, that is, the fluid medium enters the first air inlet chamber 242 and the second air inlet chamber 282 after passing through the filtering mechanism 36, so as to ensure the cleanliness of the fluid medium entering the first air inlet chamber 242 and the second air inlet chamber 282.

Figure 7:
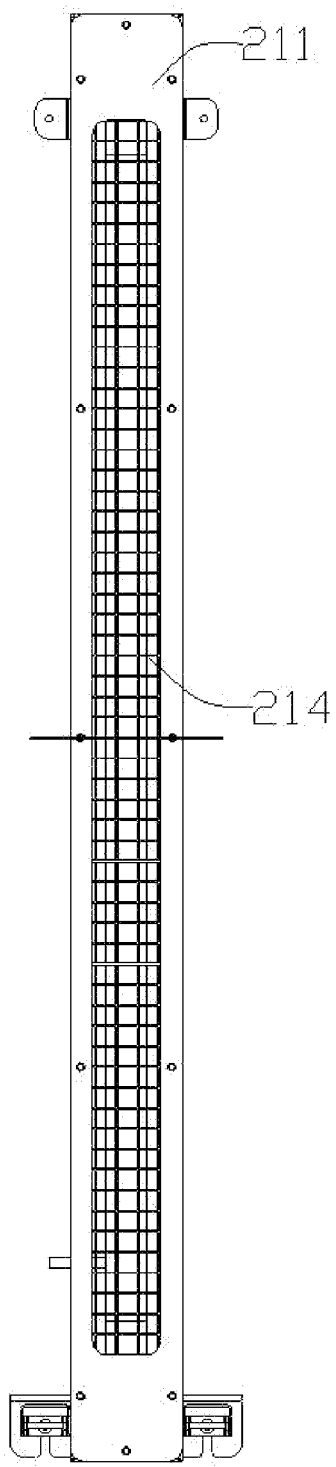
FIG. 7 is a schematic structural view of a first point of view of a heating assembly provided in some embodiments of the present application.
Figure 8:
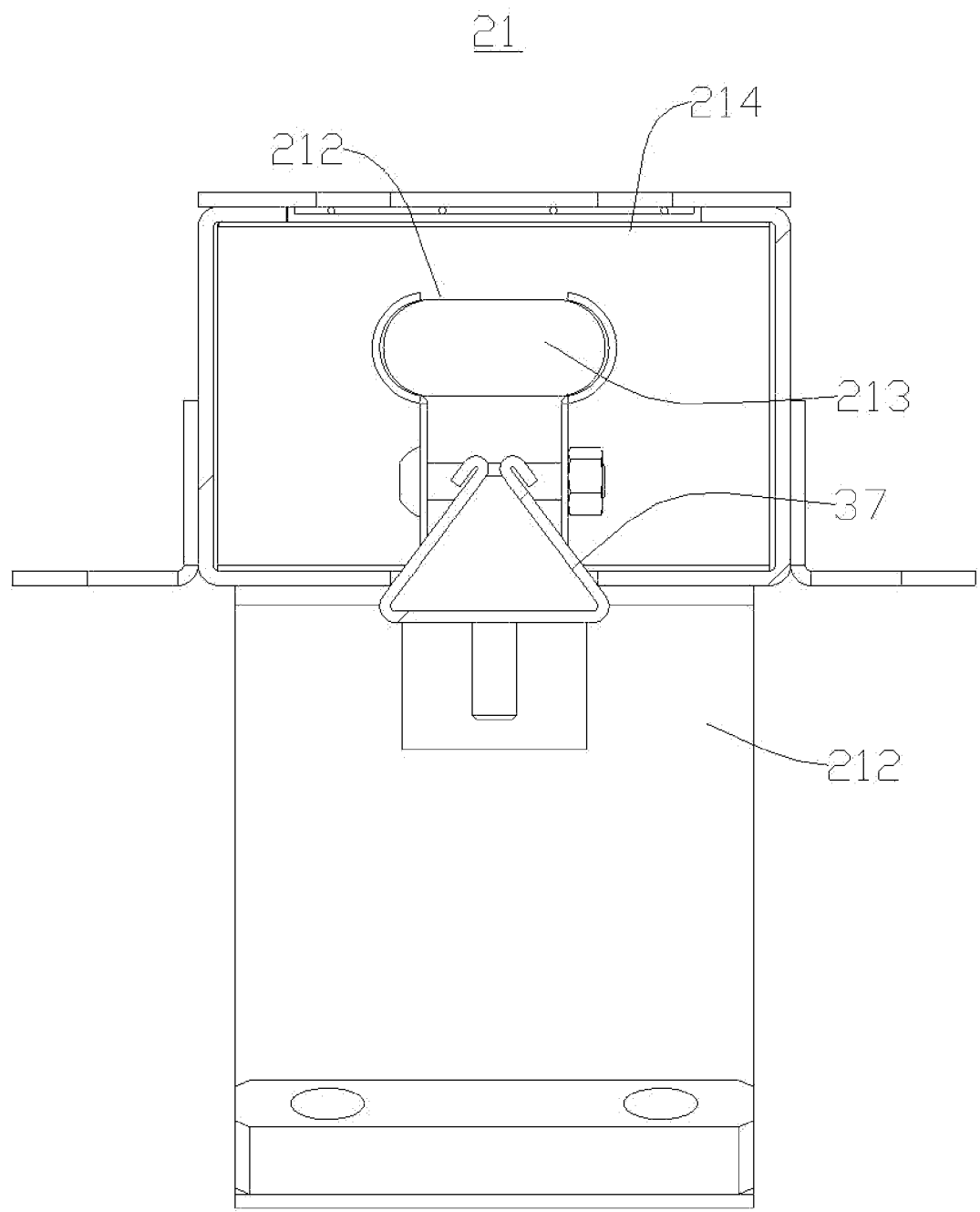
FIG. 8 is a schematic structural view of a second point of view of a heating assembly provided in some embodiments of the present application.

As shown in FIGS. 7 and 8, in some embodiments, the heating assembly 21 comprises a mounting bracket 211 and a heating unit 213, wherein the mounting bracket 211 is disposed on the first oven drying side 201 so that the heat generated by the heating unit 213 takes a shorter path to reach the substrate 3000, thus reducing heat loss.

The heating unit 213 may be a heating resistance wire, an infrared lamp, and so on. Taking the heating unit 213 being an infrared lamp as an example, the mounting bracket 211 is provided with a fixing groove 212, with the groove mouth of the fixing groove 212 facing the substrate 3000, and the infrared lamp is clamped in the fixing groove 212.

In some embodiments, the heating assembly 21 further comprises a guard member 214, the guard member 214 being disposed on the mounting bracket 211 and enclosing the outer periphery of the heating unit 213. The arrangement of the guard member 214 can separate the heating unit 213 and the to-be-oven-dried member, so as to avoid damaging the to-be-oven-dried member due to direct contact between the to-be-oven-dried member and the heating unit 213, thus playing the role of safety protection. The guard member 214 may be connected to the mounting bracket 211 with a quick-snap structure, which can be quickly disassembled and easy to mount or replace. Of course, the guard member 214 may also be mounted on the mounting bracket 211 by means of bolts, screws, welding, etc. The guard member 214 may be made of stainless steel mesh, which has strong heat resistance and will not affect the heat transfer of the heating unit 213.

In some embodiments, the oven drying apparatus 200 comprises an air blowing portion 37, the air blowing portion 37 being configured to provide fluid medium to the heating assembly 21 to adjust the temperature of the heating assembly 21.

The air blowing portion 37 is capable of providing fluid medium to the heating assembly 21 to adjust the temperature of the heating assembly 21, for example, the air blowing portion 37 provides cool air to the heating assembly 21 to cool down the heating assembly 21, which can improve the life of the heating assembly 21.

The air blowing portion 37 is disposed on the mounting bracket 211, so that the air blowing portion 37 is disposed close to the heating unit 213, and thus the fluid medium entering via the air blowing portion 37 can act on the heating unit 213 directly or after a short distance, thereby reducing the influence of the fluid medium provided by the air blowing portion 37 on the temperature inside the oven drying chamber 20.

As shown in FIG. 8, the air blowing portion 37 comprises a slit air nozzle for air to pass through to reach the heating assembly 21 and thereby cool the heating assembly 21. The fluid medium entering via the air blowing portion 37 and passing through the heating unit 213 can be heated by the heating unit 213, which not only functions to reduce the temperature of the heating unit 213, but also accelerates the air flow and heat diffusion in the oven drying chamber 20. The air outlet of the air blowing portion 37 faces the heating unit 213, so that the fluid medium blown from the air blowing portion 37 can directly act on the heating unit 213 and be heated, thus reducing the possibility that the fluid medium blown from the air blowing portion 37 is not heated and then diffused within the oven drying chamber 20.

Figure 9:
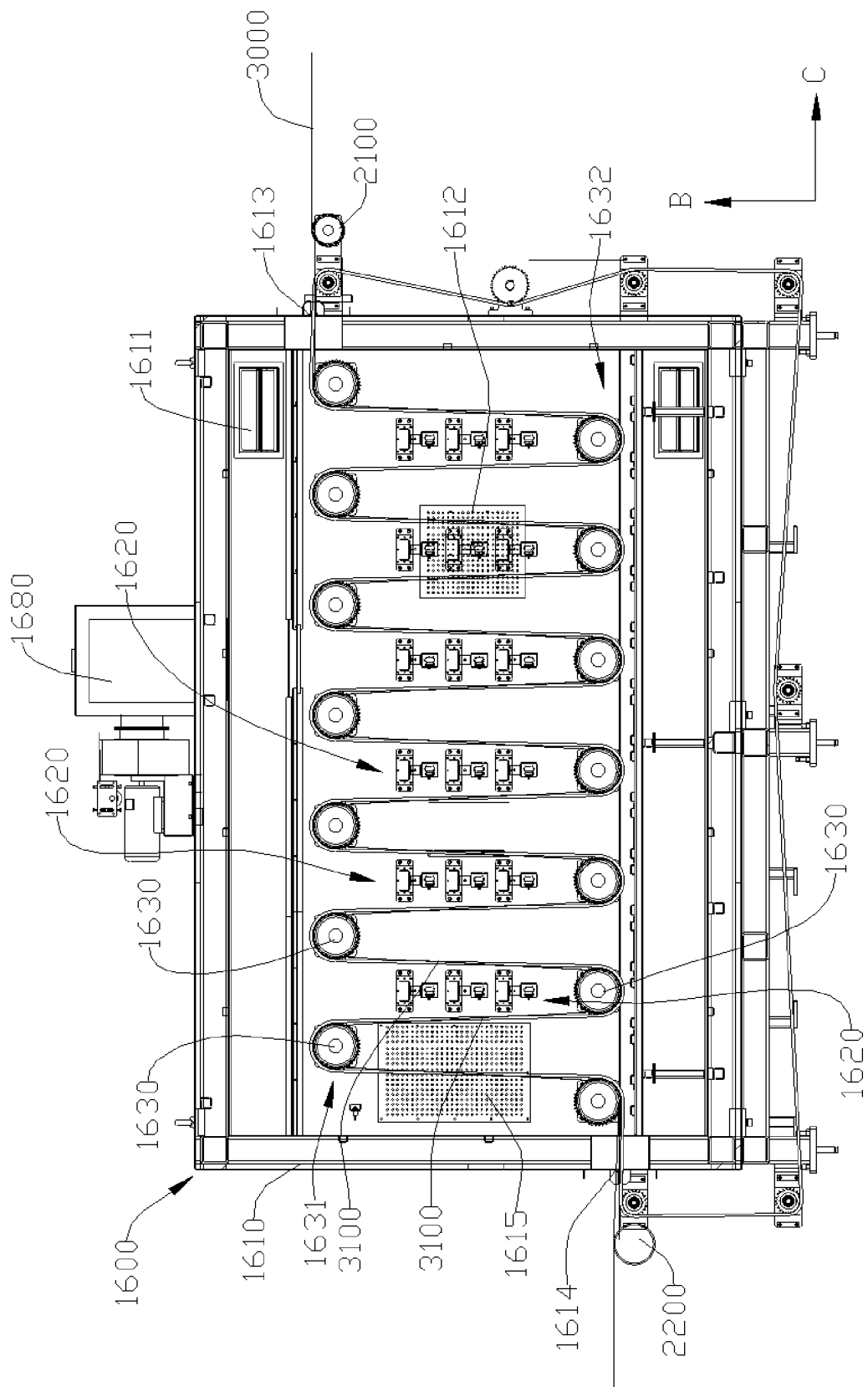
FIG. 9 is a schematic structural view of a first point of view of a heating apparatus provided in some embodiments of the present application.

As shown in FIG. 9, in some embodiments, the heating apparatus 1600 comprises a heating box 1610, oven drying assemblies 1620, and a plurality of drive rollers 1630, wherein the oven drying assemblies 1620 and the plurality of drive rollers 1630 are all disposed in the heating box 1610; the plurality of drive rollers 1630 are used to convey the substrate 3000, with the substrate 3000 forming conveying sections 3100 between two adjacent drive rollers 1630; and the oven drying assemblies 1620 are disposed between two adjacent and opposite conveying sections 3100 and are disposed facing the second surface of the substrate 3000 so that the oven drying assemblies 1620 oven dry the coating on the second surface of the substrate 3000.

The arrangement of the plurality of drive rollers 1630 within the heating box 1610 can increase the conveying distance of the substrate 3000 within the heating box 1610, which can extend the drive time of the substrate 3000 within the heating box 1610, thereby extending the oven drying time.

In some embodiments, part of the plurality of drive rollers 1630 are first drive rollers 1631 and the other part of the plurality of drive rollers 1630 are second drive rollers 1632, with the number of first drive rollers 1631 being a plurality and the number of second drive rollers 1632 being a plurality. The plurality of first drive rollers 1631 and the plurality of second drive rollers 1632 are arranged at intervals along the second direction B, the plurality of first drive rollers 1631 are arranged in rows along the third direction C, and the plurality of second drive rollers 1632 are arranged in rows along the second direction B, the second direction B being perpendicular to the third direction C. The substrate 3000 wraps around the first drive rollers 1631 and the second drive rollers 1632 sequentially along its direction of belt-conveying, and the substrate 3000 forms conveying sections 3100 between two adjacent first drive rollers 1631 and second drive rollers 1632. Thus, along the third direction, the substrate 3000 is divided into a plurality of conveying sections 3100 arranged at intervals, and at least one oven drying assembly 1620 is disposed between two adjacent conveying sections 3100, then that oven drying assembly 1620 can simultaneously heat the coatings on the second surfaces of the two adjacent conveying sections 3100, which can improve the efficiency of heating.

The heating apparatus 1600 comprises a plurality of oven drying assemblies 1620, and the plurality of oven drying assemblies 1620 are arranged at intervals in the heating box 1610 along the direction of belt-conveying of the substrate 3000, which can improve the quality of oven drying and the efficiency of oven drying.

In some embodiments, the heating power of the heating apparatus 1600 can be smaller than the heating power of any oven drying apparatus 200, so as to reduce the influence of the heat of the heating apparatus 1600 on the coating on the first surface when the heating apparatus 1600 is performing oven drying of the coating on the second surface for a second time. The heating power of two oven drying apparatuses 200 can be the same or different, and the oven drying apparatus 200 of the corresponding power can be selected according to the thicknesses of the coating on the first surface and the coating on the second surface, the requirement of the degree of oven drying, and so on.

The heating box 1610 is also provided with an air supply portion 1611 for fluid medium to enter the heating box 1610 and an air discharge portion 1612 for fluid medium to be discharged from the heating box 1610; the heating apparatus 1600 further comprises a circulation assembly 1640, wherein the circulation assembly 1640 is configured to import the fluid medium discharged from the discharge portion 1612 into the heating box 1610 via the air supply portion 1611, so as to fully utilize the heat generated by the oven drying assembly 1620, thus reducing energy consumption.

In some embodiments, the heating box 1610 is also provided with a second inlet 1613 for the substrate 3000 to reach into the heating box 1610 and a second outlet 1614 for the substrate 3000 to reach out of the heating box 1610. As the substrate 3000 reaches into the heating box 1610 via the second inlet 1613 and reaches out of the heating box 1610 via the second outlet 1614, the oven drying assembly 1620 oven dries the coating on the second surface of the substrate 3000.

The coating device 1000 further comprises an import roller 2100 and an export roller 2200, wherein the import roller 2100 is disposed at the second inlet 1613 and the import roller 2100 is configured to import the substrate 3000 via the second inlet 1613 into the heating box 1610, so that the substrate 3000 is steadily and smoothly conveyed from a previous station (e.g., the second traction apparatus 1100) of the heating apparatus 1600 to the heating apparatus 1600. The export roller 2200 is disposed at the second outlet 1614, and the export roller 2200 is configured to export the substrate 3000 out of the heating box 1610 via the second outlet 1614, so that the substrate 3000 is steadily conveyed from the heating apparatus 1600 to the next station (e.g., the cooling and traction apparatus 1700).

In some embodiments, both the import roller 2100 and the export roller 2200 are disposed on the outer wall of the heating box 1610 to allow the substrate 3000 to enter the heating box 1610 and move out of the heating box 1610 smoothly, thus reducing the risk of the substrate 3000 being damaged due to scratches as the substrate 3000 enters the heating box 1610 and moves out of the heating box 1610.

In some embodiments, only one of the import roller 2100 and the export roller 2200 is disposed in the heating box 1610, and the other one can be disposed in apparatuses corresponding to other stations, for example, the import roller 2100 is disposed in the heating box 1610, and the export roller 2200 can be disposed in the cooling and traction apparatus 1700 downstream of the heating apparatus 1600.

In some embodiments, the heating apparatus 1600 further comprises a filtering assembly 1650, wherein the filtering assembly 1650 is disposed in the air inlet portion, the filtering assembly 1650 is configured to filter the fluid medium entering the heating box 1610 via the air inlet portion, so as to ensure the cleanliness of the fluid medium entering the heating box 1610, thus ensuring the safety of heating and oven drying and the quality of oven drying. The filtering assembly 1650 may be a structure such as a filter screen.

Figure 10:
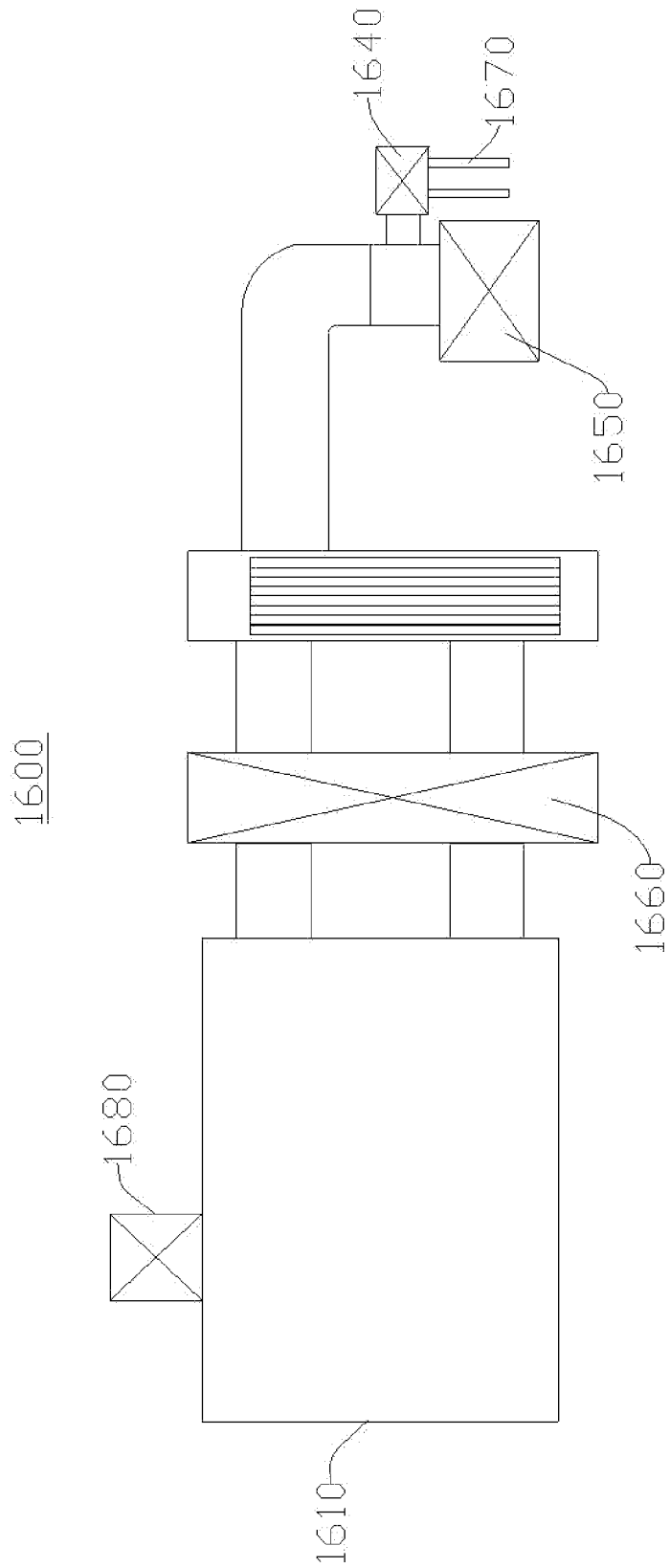
FIG. 10 is a schematic structural view of a second point of view of a heating apparatus provided in some embodiments of the present application.

As shown in FIG. 10, in some embodiments, the heating apparatus 1600 further comprises a second fresh air port 1670, and the circulation assembly 1640 draws fresh air from the outside via the second fresh air port 1670 and imports the fresh air via the air supply portion 1611 into the heating box 1610.

In some embodiments, the heating apparatus 1600 further comprises a second pre-heating assembly 1660, wherein the second pre-heating assembly 1660 is disposed in the air supply portion 1611, the pre-heating assembly is configured to pre-heat the fluid medium entering the heating box 1610 via the air supply portion 1611, and in particular, needs to pre-heat the fresh air drawn via the second fresh air port 1670, so as to avoid a too low temperature of the fluid medium entering the heating box 1610 via the air supply portion 1611, which reduces the temperature in the heating box 1610 and affects the oven drying of the coating on the second surface of the substrate 3000 by the heating apparatus 1600. Here, the second pre-heating assembly 1660 is disposed downstream of the filtering assembly 1650, that is, the fresh air is first filtered through the filtering assembly 1650 and then pre-heated by the second pre-heating assembly 1660.

In some embodiments, the heating box 1610 is also provided with a second air discharge port 1615 in communication with the interior space of the heating box 1610, and the heating apparatus 1600 further comprises a second air discharge unit 1680, wherein the second air discharge unit 1680 is used to discharge fluid medium inside the heating box 1610 via the second air discharge port 1615, and in the process of discharging the fluid medium inside the heating box 1610 by the second air discharge unit 1680, the fluid medium is discharged carrying the solvent evaporated from the oven drying of the coating of the substrate 3000, thereby reducing the weight loss ratio.

Figure 11:
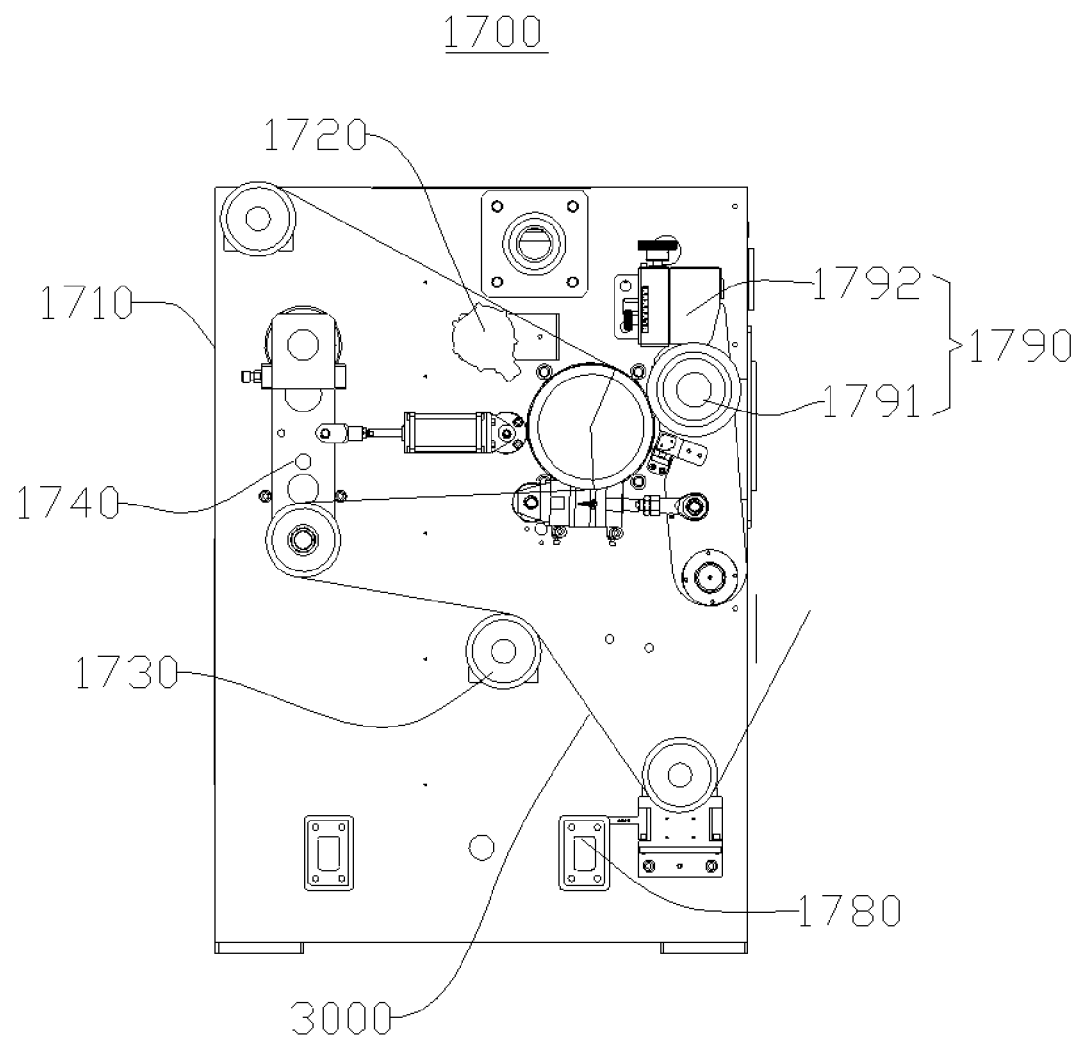
FIG. 11 is a schematic structural view of a cooling and traction apparatus provided in some embodiments of the present application.

As shown in FIG. 11, in some embodiments, the cooling and traction apparatus 1700 comprises a cooling box 1710, a cooling portion 1720, and a plurality of traction rollers 1730, wherein the cooling portion 1720 and the plurality of traction rollers 1730 are all disposed in the cooling box 1710, and the cooling portion 1720 is configured to provide fluid medium to the substrate 3000, so as to adjust the temperature of the substrate 3000. The plurality of traction rollers 1730 are configured for the substrate 3000 to be wrapped sequentially in the direction of its movement to convey the substrate 3000.

In some embodiments, the cooling and traction apparatus 1700 further comprises a tension adjustment mechanism 1740, wherein the tension adjustment mechanism 1740 is disposed in the cooling box 1710, and the tension adjustment mechanism 1740 is configured to adjust the tension of the substrate 3000 to balance the tension of the substrate 3000, thereby ensuring steady conveying of the substrate 3000.

In some embodiments, the cooling and traction apparatus 1700 further comprises a tension sensor 1780, wherein the tension sensor 1780 is disposed in the cooling box 1710, the tension sensor 1780 is used to detect the tension of the substrate 3000, and the tension adjustment mechanism 1740 adjusts the tension of the substrate 3000 according to the tension signal of the substrate 3000 that is acquired by the tension sensor 1780, so as to balance the tension of the substrate 3000, thus enabling steady conveying.

In some embodiments, the cooling and traction apparatus 1700 further comprises a tension separation mechanism 1790, wherein the tension separation mechanism 1790 is configured to cooperate with one traction roller 1730 in the plurality of traction rollers 1730 to compress the substrate 3000, so that the substrate 3000 can form different tensions for the substrate 3000 located on two sides of the tension separation mechanism 1790 along the direction of belt-conveying of the substrate 3000, so as to meet the requirement of steady conveying. The tension separation mechanism 1790 comprises a pressing roller 1791 and a pressing roller drive unit 1792, wherein the pressing roller drive unit 1792 drives the pressing roller 1791 to move in the cooling box 1710 to adjust the distance between the circumferential face of the pressing roller 1791 and the circumferential face of the traction roller 1730 that cooperates with the tension separation mechanism 1790, so as to adjust the degree of compression of the pressing roller 1791 and the traction roller 1730 on the substrate 3000, thereby adjusting the friction between the substrate 3000 and the traction roller 1730, so that the substrate 3000 can form different tensions for the substrate 3000 located on two sides of the tension separation mechanism 1790.

The above description is only preferred embodiments of the present application, and is not intended to limit the present application, and for those skilled in the art, the present application may be subjected to various modifications and changes. Any modification, equivalent substitution, improvement, etc., made within the spirit and principles of the present application shall be included in the protection scope of the present application.

The invention claimed is:

1. An oven drying apparatus, comprising: an oven drying chamber for accommodating a to-be-oven-dried member, the oven drying chamber having a first oven drying side facing the to-be-oven-dried member, with the first oven drying side having a plurality of first air inlet portions for fluid medium to enter the oven drying chamber; and a heating assembly disposed on the first oven drying side, the heating assembly being configured to oven-dry the to-be-oven-dried member; wherein the first oven drying side is further provided with an air return portion, at least one air return portion being provided between two adjacent first air inlet portions, and the air return portion being configured for fluid medium in the oven drying chamber to be discharged from the oven drying chamber,
wherein the first air inlet portions, the heating assembly, and the air return portion are disposed on a same side of the to-be-oven-dried member, and
wherein the oven drying chamber further has a second oven drying side arranged opposite to the first oven drying side in a first direction, the second oven drying side being provided with a plurality of second air inlet portions for fluid medium to enter the oven drying chamber.

2. The oven drying apparatus according to claim 1, wherein the oven drying apparatus comprises a first wall facing the to-be-oven-dried member in a first direction, the first air inlet portions, the heating assembly, and the air return portion being all disposed on the first wall; and the oven drying apparatus further comprises a first driver to adjust a distance between the first wall and the to-be-oven-dried member in the first direction.

3. The oven drying apparatus according to claim 1, wherein the oven drying apparatus further comprises a first air inlet chamber, the first air inlet chamber being separated from the oven drying chamber by a first wall, the first air inlet portions, the heating assembly, and the air return portion being all disposed on the first wall; wherein the first air inlet portions are used for fluid medium in the first air inlet chamber to enter the oven drying chamber.

4. The oven drying apparatus according to claim 3, wherein the oven drying apparatus further comprises an air return chamber and a circulator, the air return chamber being configured to accommodate fluid medium discharged from the air return portion and the circulator being configured to import fluid medium in the air return chamber into the first air inlet chamber.

5. The oven drying apparatus according to claim 1, wherein the oven drying apparatus comprises a first wall facing the to-be-oven-dried member in the first direction and a second wall arranged opposite to the first wall; the first air inlet portions, the heating assembly, and the air return portion being all disposed on the first wall and the second air inlet portions being disposed on the second wall; the oven drying chamber being located between the first wall and the second wall in the first direction; and the oven drying apparatus further comprises a second driver to drive the second wall to move to adjust a distance between the second wall and the first wall in the first direction.

6. The oven drying apparatus according to claim 1, wherein at least one heating assembly is provided between two adjacent first air inlet portions.

7. The oven drying apparatus according to claim 1, wherein the oven drying apparatus comprises an air blowing structure to provide fluid medium to the heating assembly to adjust a temperature of the heating assembly.

8. The oven drying apparatus according to claim 7, wherein the heating assembly comprises a mounting bracket and a heater, the mounting bracket being disposed on the oven drying side, and the heater and the air blowing structure being both disposed on the mounting bracket.

9. The oven drying apparatus according to claim 8, wherein the heating assembly further comprises a guard disposed on the mounting bracket and enclosing an outer periphery of the heater.

10. The oven drying apparatus according to claim 1, wherein a distance between one of the two first air inlet portions and the air return portion is equal to another distance between another one of the two first air inlet portions and the air return portion.

11. A coating device, comprising: a coating apparatus configured to coat a substrate; and the oven drying apparatus according to claim 1, which is used for oven-drying a coating coated on the substrate.

12. The coating device according to claim 11, wherein the coating apparatus comprises a first coating structure and a second coating structure, the second coating structure being disposed downstream of the first coating structure, and the first coating structure being configured to coat a first surface of the substrate and the second coating structure being configured to coat a second surface of the substrate that is opposite to the first surface; and the coating device comprises two oven drying apparatuses, one of the two oven drying apparatuses being disposed downstream of the first coating structure and located upstream of the second coating structure to oven dry a coating on the first surface, and the other of the two oven drying apparatuses being located downstream of the second coating structure to oven dry a coating on the second surface.

13. The coating device according to claim 12, wherein the coating device further comprises a heating apparatus, the heating apparatus being disposed downstream of the oven drying apparatus located downstream of the second coating structure, and the heating apparatus being configured to oven dry the coating on the second surface.

14. An oven drying apparatus, comprising: an oven drying chamber for accommodating a to-be-oven-dried member, the oven drying chamber having a first oven drying side facing the to-be-oven-dried member, with the first oven drying side having a plurality of first air inlet portions for fluid medium to enter the oven drying chamber; and a heating assembly disposed on the first oven drying side, the heating assembly being configured to oven-dry the to-be-oven-dried member; wherein the first oven drying side is further provided with an air return portion, at least one air return portion being provided between two adjacent first air inlet portions, and the air return portion being configured for fluid medium in the oven drying chamber to be discharged from the oven drying chamber, wherein the oven drying chamber further has a second oven drying side arranged opposite to the first oven drying side in a first direction, the second oven drying side being provided with a plurality of second air inlet portions for fluid medium to enter the oven drying chamber.

15. The oven drying apparatus according to claim 14, wherein the oven drying apparatus comprises a first wall facing the to-be-oven-dried member in a first direction, the first air inlet portions, the heating assembly, and the air return portion being all disposed on the first wall; and the oven drying apparatus further comprises a first driver to adjust a distance between the first wall and the to-be-oven-dried member in the first direction.

16. The oven drying apparatus according to claim 14, wherein the oven drying apparatus further comprises a first air inlet chamber, the first air inlet chamber being separated from the oven drying chamber by a first wall, the first air inlet portions, the heating assembly, and the air return portion being all disposed on the first wall; wherein the first air inlet portions are used for fluid medium in the first air inlet chamber to enter the oven drying chamber.

17. The oven drying apparatus according to claim 16, wherein the oven drying apparatus further comprises an air return chamber and a circulator, the air return chamber being configured to accommodate fluid medium discharged from the air return portion and the circulator being configured to import fluid medium in the air return chamber into the first air inlet chamber.

18. The oven drying apparatus according to claim 14, wherein the oven drying apparatus comprises a first wall facing the to-be-oven-dried member in the first direction and a second wall arranged opposite to the first wall; the first air inlet portions, the heating assembly, and the air return portion being all disposed on the first wall and the second air inlet portions being disposed on the second wall; the oven drying chamber being located between the first wall and the second wall in the first direction; and the oven drying apparatus further comprises a second driver to drive the second wall to move to adjust a distance between the second wall and the first wall in the first direction.

19. The oven drying apparatus according to claim 14, wherein at least one heating assembly is provided between two adjacent first air inlet portions.

* * * * *